(12) United States Patent
Ando et al.

(10) Patent No.: US 6,385,744 B1
(45) Date of Patent: May 7, 2002

(54) DATA RECORDING MEDIUM, DATA RECORDING METHOD AND DATA REPRODUCING METHOD

(75) Inventors: Hideo Ando, Tokyo; Hideki Takahashi, Nagareyama; Hiroaki Unno, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/204,157

(22) Filed: Dec. 3, 1998

(30) Foreign Application Priority Data

Jan. 21, 1998 (JP) .......................................... 10-009902

(51) Int. Cl.$^7$ ................................................. H04L 1/22
(52) U.S. Cl. ............................... 714/54; 714/6; 360/53; 369/275.3
(58) Field of Search ............................... 360/53, 77.04; 714/6, 8, 770, 5, 54; 369/53.35, 275.2, 275.3

(56) References Cited

U.S. PATENT DOCUMENTS

| 5,568,606 A | * | 10/1996 | Dobbek |
| 5,781,722 A | * | 7/1998 | Buches, Jr. |
| 5,790,333 A | * | 8/1998 | Kimura et al. ................. 360/60 |
| 5,966,358 A | * | 10/1999 | Mine ............................. 369/58 |
| 6,049,515 A | * | 4/2000 | Yamamuro ..................... 369/48 |
| 6,137,646 A | * | 10/2000 | Okamura et al. .............. 360/51 |
| 6,182,240 B1 | * | 1/2001 | Mine ............................... 714/5 |
| 6,215,759 B1 | * | 4/2001 | Tanoue et al. ............ 369/275.3 |

* cited by examiner

*Primary Examiner*—Paul R. Meyers
(74) *Attorney, Agent, or Firm*—Oblon, Spivak, McClelland, Maier & Neustadt, P.C.

(57) ABSTRACT

This invention is to record data and skip an ECC block containing a defective sector when the defective sector is detected in an optical disk in which data is recorded in an ECC block unit constructed by 16 sectors and record a physical block number obtained by adding an amount of 16 sectors for each skipping into a reserve field of each sector of a next ECC block. Thus, continuous data such as moving pictures can be recorded in the ECC block unit, an ECC block containing the defective sector can be detected later in a case wherein the power supply is turned OFF by mistake or power failure in the course of recording when the recording process is effected while skipping an ECC block containing a defective sector, and data recorded up to the interruption can be reproduced without being influenced by the defective sector.

18 Claims, 14 Drawing Sheets

| 2 BYTES | 91 BYTES | 2 BYTES | 91 BYTES | |
|---|---|---|---|---|
| SYNCHRONIZATION CODES | SECTOR 1 (1/2) | SYNCHRONIZATION CODES | SECTOR 1 (2/2) | } 12 ROWS |
| SYNCHRONIZATION CODES | 1/16 ECC2 | SYNCHRONIZATION CODES | 1/16 ECC2 | } 1 ROW |
| SYNCHRONIZATION CODES | SECTOR 2 (1/2) | SYNCHRONIZATION CODES | SECTOR 2 (2/2) | } 12 ROWS |
| SYNCHRONIZATION CODES | 2/16 ECC2 | SYNCHRONIZATION CODES | 2/16 ECC2 | } 1 ROW |
| SYNCHRONIZATION CODES | . . . | SYNCHRONIZATION CODES | . . . | |
| SYNCHRONIZATION CODES | SECTOR 16 (1/2) | SYNCHRONIZATION CODES | SECTOR 16 (2/2) | } 12 ROWS |
| SYNCHRONIZATION CODES | 16/16 ECC2 | SYNCHRONIZATION CODES | 16/16 ECC2 | } 1 ROW |

FIG. 6

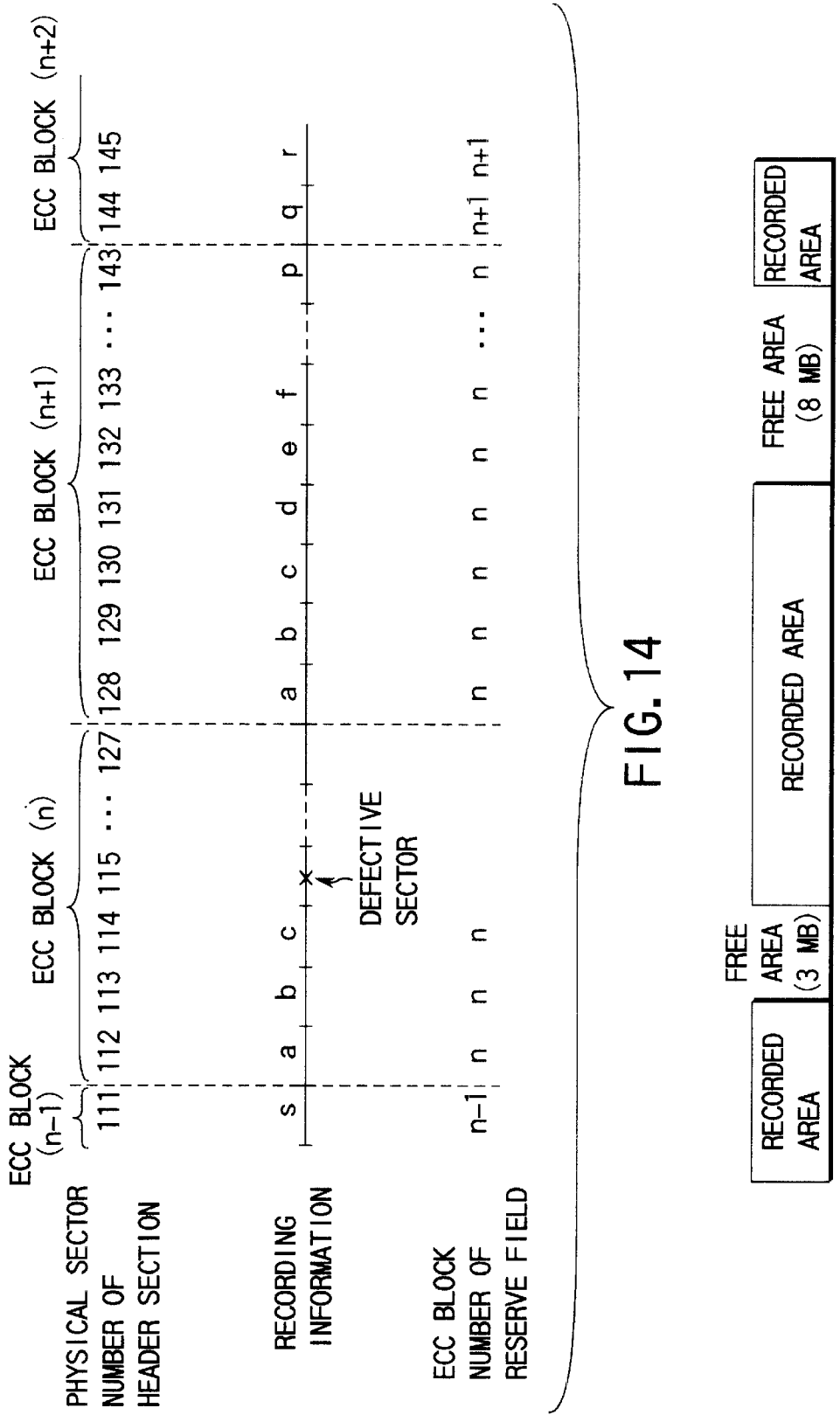

DATA RECORDING MEDIUM, DATA RECORDING METHOD AND DATA REPRODUCING METHOD

BACKGROUND OF THE INVENTION

This invention relates to a data recording medium such as an optical disk on which data is recorded or from which recorded data is reproduced, a data recording method for recording data on the recording medium, and a data reproducing method for reproducing data recorded on the data recording medium.

Conventionally, an optical disk apparatus for recording data on an optical disk having recording tracks or reproducing data recorded on the optical disk by use of laser light output from a semiconductor laser oscillator mounted on an optical head is put into practice.

With the above optical disk apparatus, data is recorded in the ECC block unit including a plurality of sectors on the optical disk.

With the above optical disk apparatus, an error in the sector unit, that is, a defective sector is detected and data is recorded or reproduced while skipping the defective sector.

Data on the defective sector is collectively recorded in the defect management area at the end of the data recording process.

Therefore, when the power supply is turned OFF in the course of continuously recording data such as moving pictures, data on the defective sector is not recorded on the optical disk and proper measure cannot be taken for the defect later.

BRIEF SUMMARY OF THE INVENTION

An object of this invention is to provide a data recording medium, data recording method and data reproducing method capable of detecting the defect position later and taking proper measure later when the power supply is turned OFF in the course of continuously recording data such as moving pictures.

According to one aspect of this invention, the above object can be attained by a data recording medium which has tracks in a concentric or spiral form into which data is recorded and in which a format including groups of a plurality of successive sector fields each including an address field having a preset track length for previously recording address data indicating the position on the track and a data recording field for recording record data is defined and data is recorded in a block field unit which has a set of preset number of sector fields among said plurality of sector fields, comprising:

a defective portion searching data recording field into which data for searching for a defective portion is recorded in the data recording field of the sector field unit.

According to another aspect of this invention, the above object can be attained by a method of recording data on a data recording medium which has tracks in a concentric or spiral form into which data is recorded and in which a format including groups of a plurality of successive sector fields each including an address field having a preset track length for previously recording address data indicating the position on the track and a data recording field for recording record data is defined and data is recorded in a block field unit which has a set of preset number of sector fields among said plurality of sector fields, said method comprising the step of:

recording record data in sector fields other than a sector field containing a defect, recording record data and recording data used for searching for a defective portion into a data field of each sector field unit in a sector field free of a defect when record data are sequentially recorded into the block fields on said data recording medium.

According to still another aspect of this invention, the above object can be attained by a method of recording data on a data recording medium which has tracks in a concentric or spiral form into which data is recorded and in which a format including groups of a plurality of successive sector fields each including an address field having a preset track length for previously recording address data indicating the position on the track and a data recording field for recording record data is defined and data is recorded in a block field unit including an error correction data recording field which has a set of preset number of sector fields among said plurality of sector fields and in which error correction data for reproducing record data recorded in said preset number of sector fields is collectively recorded for the set of said preset number of sector fields, said method comprising the steps of:

skipping a sector field containing a defect in a block field unit, recording record data and error correction data into a next block field and recording data used for searching for a defective portion into a data field of each sector field unit when record data and error correction data are sequentially recorded into the block fields on said data recording medium;

recording the data used for searching for the defective portion in the data field of each of the sector field units of the next block field.

According to another aspect of this invention, the above object can be attained by a method of reproducing data recorded on a data recording medium which has tracks in a concentric or spiral form into which data is recorded and in which a format including groups of a plurality of successive sector fields each including an address field having a preset track length for previously recording address data indicating the position on the track and a data recording field for recording record data is defined and data is recorded in a block field unit including an error correction data recording field which has a set of preset number of sector fields among said plurality of sector fields and in which error correction data for reproducing record data recorded in said preset number of sector fields is collectively recorded for the set of said preset number of sector fields, said method comprising the steps of:

detecting an interruption of recording when said data recording medium is loaded;

sequentially reading data for searching for defective portions recorded in the data field of each sector field;

determining whether each data field includes a defective portion, from data for searching for defective portions thus read; and reproducing data recorded in the data recording field based on the result of determination of the determining.

According to another aspect of this invention, the above object can be attained by a method of recording data on a data recording medium in units of one sector such that the data is recorded in a recording field specified externally, said method comprising the steps of:

first step for inputting a recording start position of data, recording end position of data, recording size of data, and data to be recorded; and second step for recording data input from the first step into a portion between the recording start position and a recording end position which is newly determined so that said portion has a recording capacity greater than the data recording size input in the first step by an amount corresponding to a preset number of sectors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a diagram for illustrating the construction of the ECC block of the optical disk;

FIGS. 10 to 14 are diagrams for illustrating the recording state of a reserve field of each sector when skipping occurs in the ECC block; and FIG. 15 is a diagram for illustrating the process for recording data into every plurality of ECC blocks and recording data into a free ECC block lying in the course of recording.

DETAILED DESCRIPTION OF THE INVENTION

There will now be described an optical disk apparatus according to one embodiment of this invention with reference to the accompanying drawings.

Figure 1:
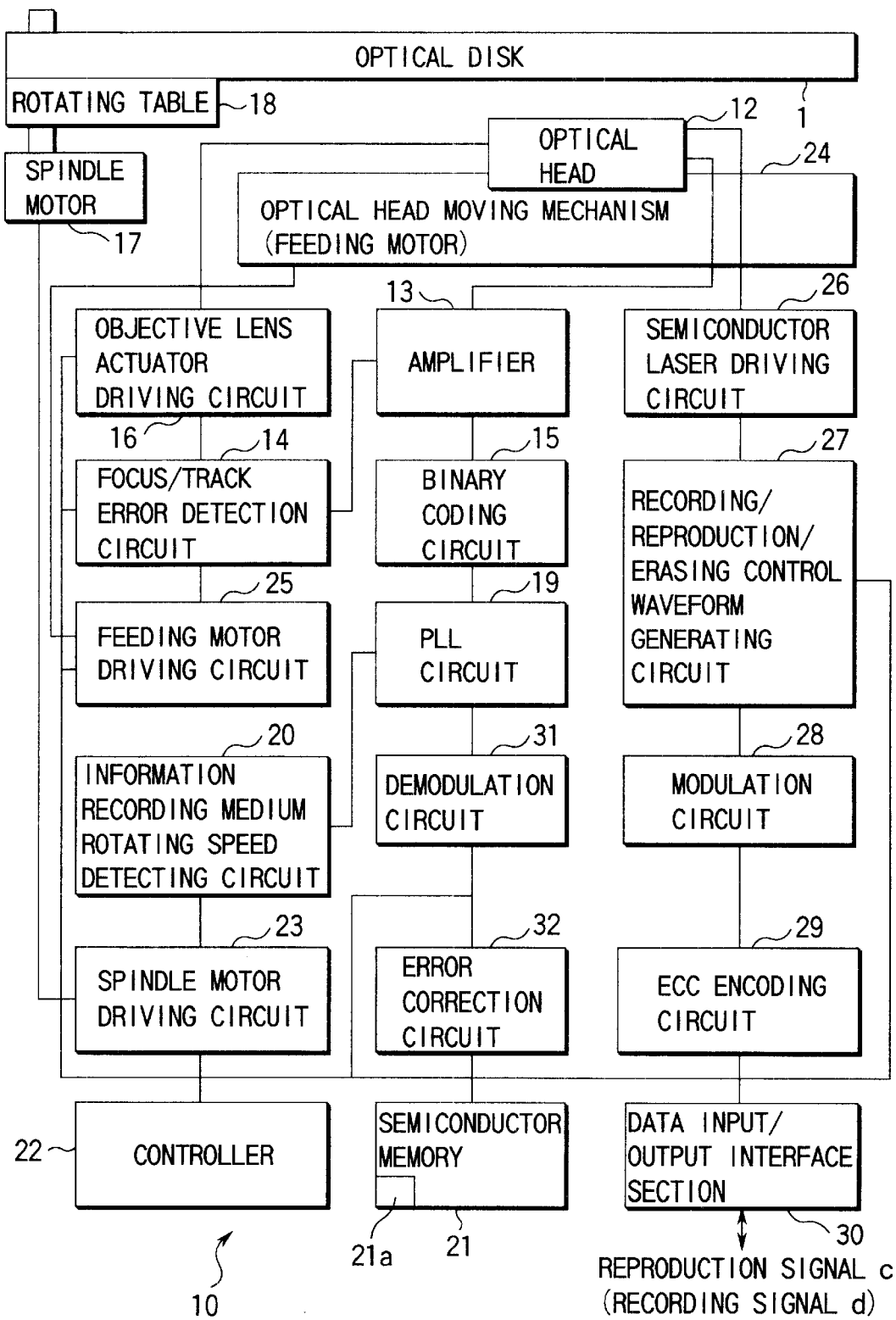
FIG. 1 is a block diagram showing the schematic construction of an optical disk apparatus.

FIG. 1 shows an optical disk device 10. The optical disk apparatus 10 effects the operation for recording data on or reproducing recorded data from an optical disk (DVD-RAM) 1 used as a recording medium by use of converged light.

The optical disk 1 is a phase changing type rewritable disk which is constructed by forming a metal coating film in a doughnut form on the surface of a substrate formed of glass or plastics in a circular form, for example, and in which grooves and lands in a concentric form or spiral form are used to record data or reproduce recorded data and address data is recorded in preset intervals by use of recording marks in the mastering process.

Figure 2:
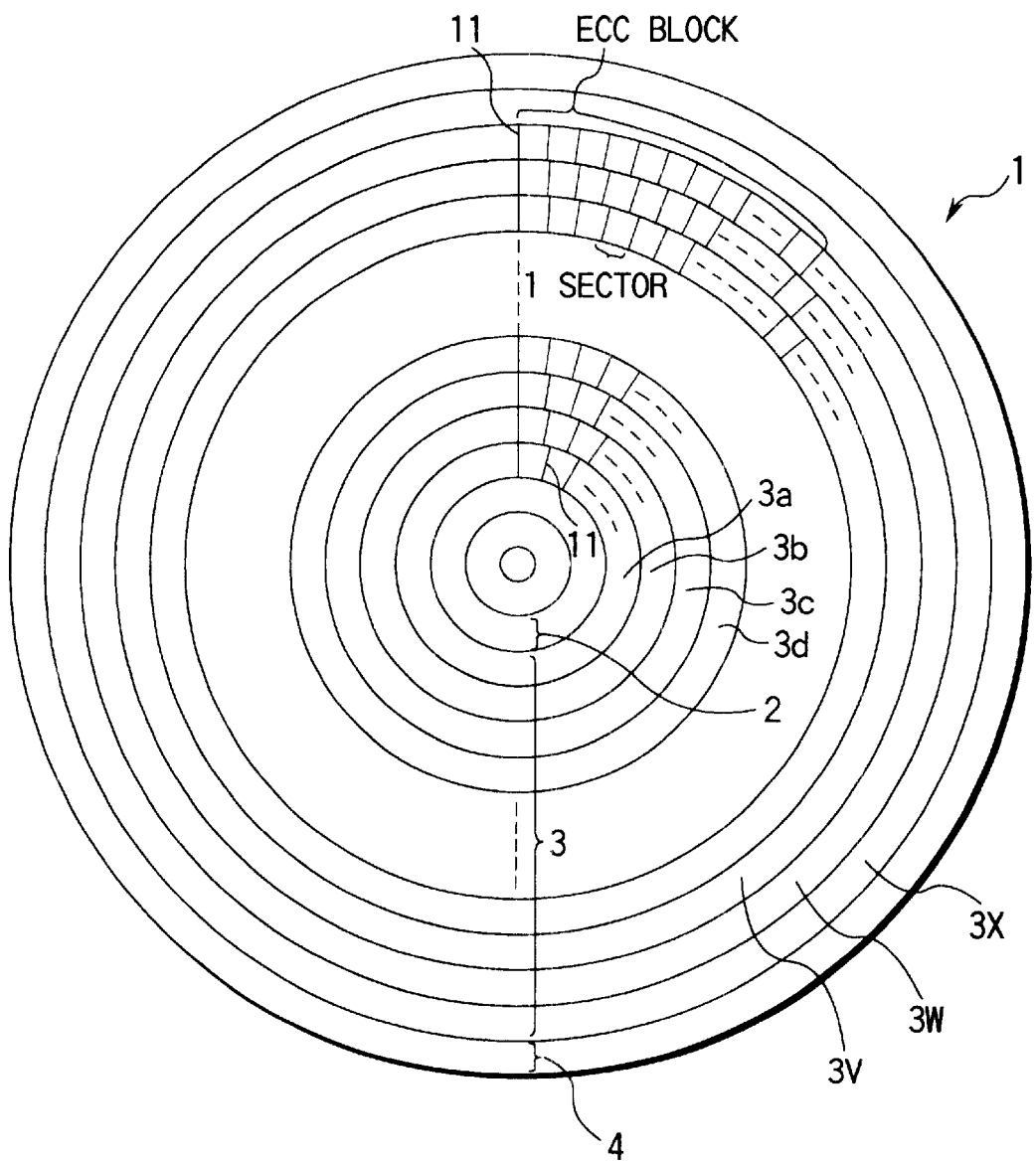
FIG. 2 is a plan view showing the schematic construction of an optical disk.
Figure 3:
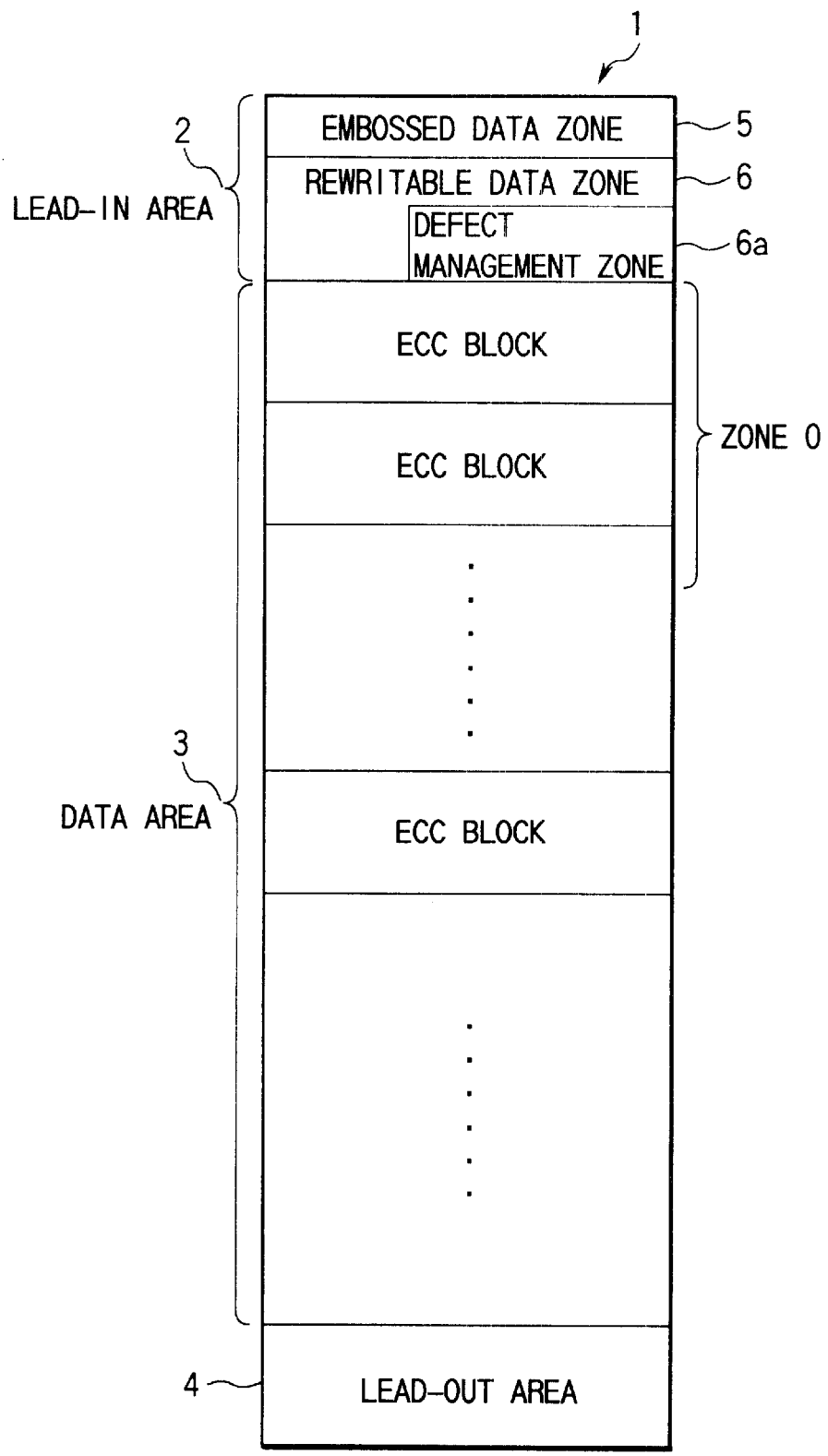
FIG. 3 is a diagram showing the schematic construction of the optical disk.

As shown in FIGS. 2 and 3, the optical disk 1 includes a lead-in area 2, data area 3 and lead-out area 4.

The lead-in area 2 includes an embossed data zone 5 having a plurality of tracks and a rewritable data zone 6 having a plurality of tracks. In the embossed zone 5, a reference signal and control data are recorded at the time of manufacturing. The rewritable data zone 6 includes a guard track zone, disk test zone, drive test zone, disk identification data zone, and defect management zone 6a used as a defect management area.

In the defect management zone 6a, defect data including a physical sector number (corresponding to a physical sector address recorded in an address section PID of a header field 11 which will be described later) of the defective sector is recorded.

As shown in FIG. 2, the data area 3 includes a plurality of, for example, 24 zones 3a, . . . 3x constructed by a plurality of tracks and arranged in the radial direction.

The lead-out area 4 includes a plurality of tracks and is a rewritable data zone like the rewritable data zone 6 and data which is the same as the recording contents of the data zone 6 can be recorded therein.

As shown in FIG. 3, the optical disk 1 has the embossed data zone 5 and rewritable data zone 6 of the lead-in area 2, the zones 3a, . . . 3x of the data area 3, and the data zone of the lead-out area 4 sequentially arranged in a direction from the central portion towards the outer periphery, the same clock signal is used for the above zones, and the rotation speed of the optical disk 1 for each zone and the number of sectors for each track are made different.

In the zones 3a, . . . 3x of the data area 3, the rotation speed becomes lower and the number of sectors for one track becomes larger in a portion of the optical disk 1 which is farther apart from the inner periphery and closer to the outer periphery.

The relation between speed data used as the rotation speed and the number of sectors for one track in each of the zones 3a, . . . 3x, 4, 5, 6 is recorded in a correspondence table of a semiconductor memory 21 as will be described later.

As shown in FIGS. 2, 3, data is recorded in the ECC (error correction code) block data unit (for example, for every 38688 bytes) as the data recording unit in the tracks of the zones 3a, . . . 3x of the data area 3.

Figure 4:
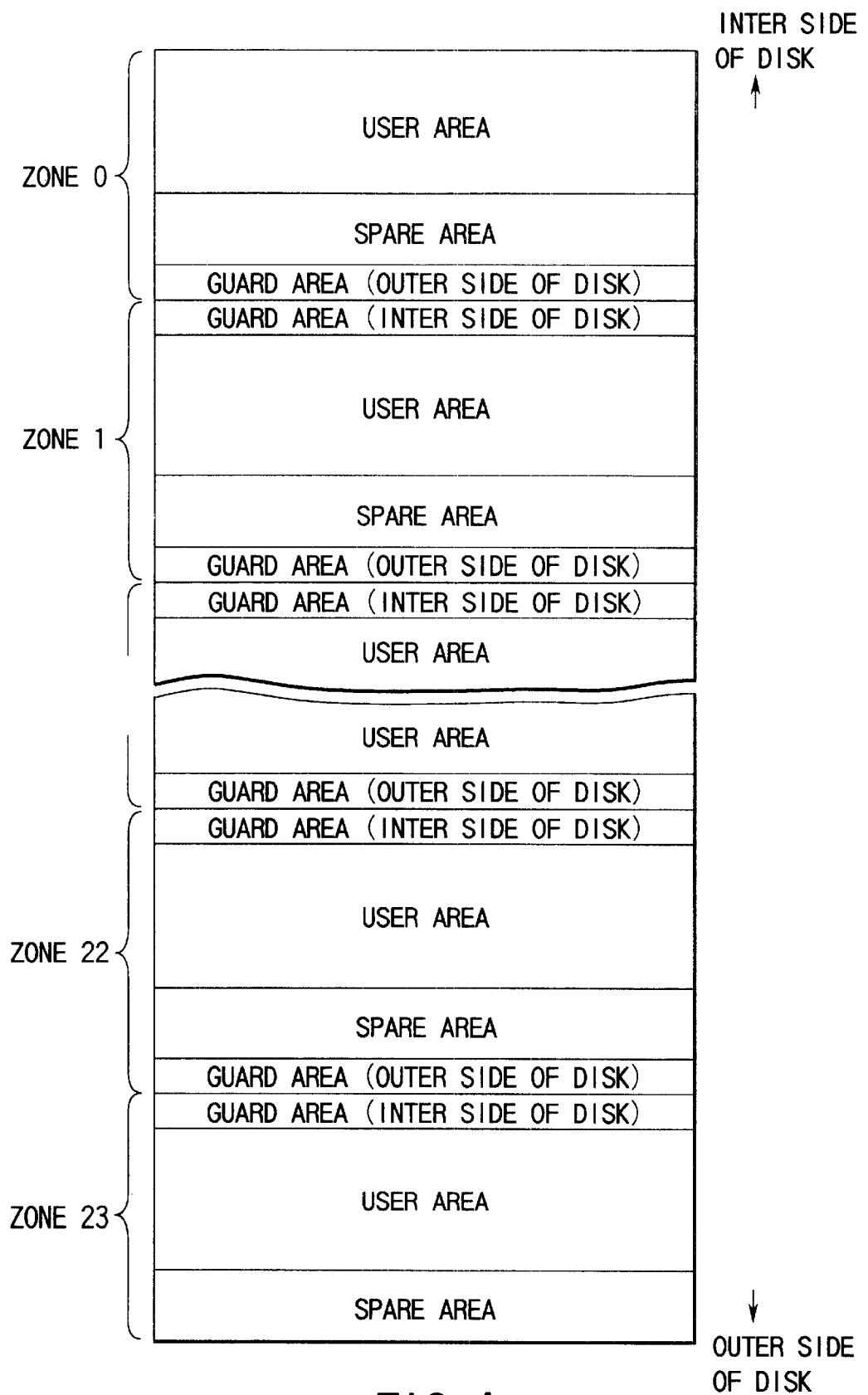
FIG. 4 is a diagram showing the schematic construction of each data area of the optical disk.

As shown in FIG. 4, each of the zones 3a, . . . 3x includes a user area and spare area. The spare area is provided on the outer side of a corresponding user area. A preset number of ECC blocks can be recorded in the user area, but when moving pictures are continuously recorded, data is recorded while skipping an ECC block containing an error sector. In order to prevent the recording capacity for each zone from being reduced, that is, to prevent the recording capacity from becoming small, alternative ECC blocks corresponding to the skipped ECC blocks are recorded into the spare area in the same zone.

Guard areas are provided for the inner side and outer side of each zone. However, no guard area is provided for the inner side of the zone 0 and the outer side of the zone 23.

Figure 5:
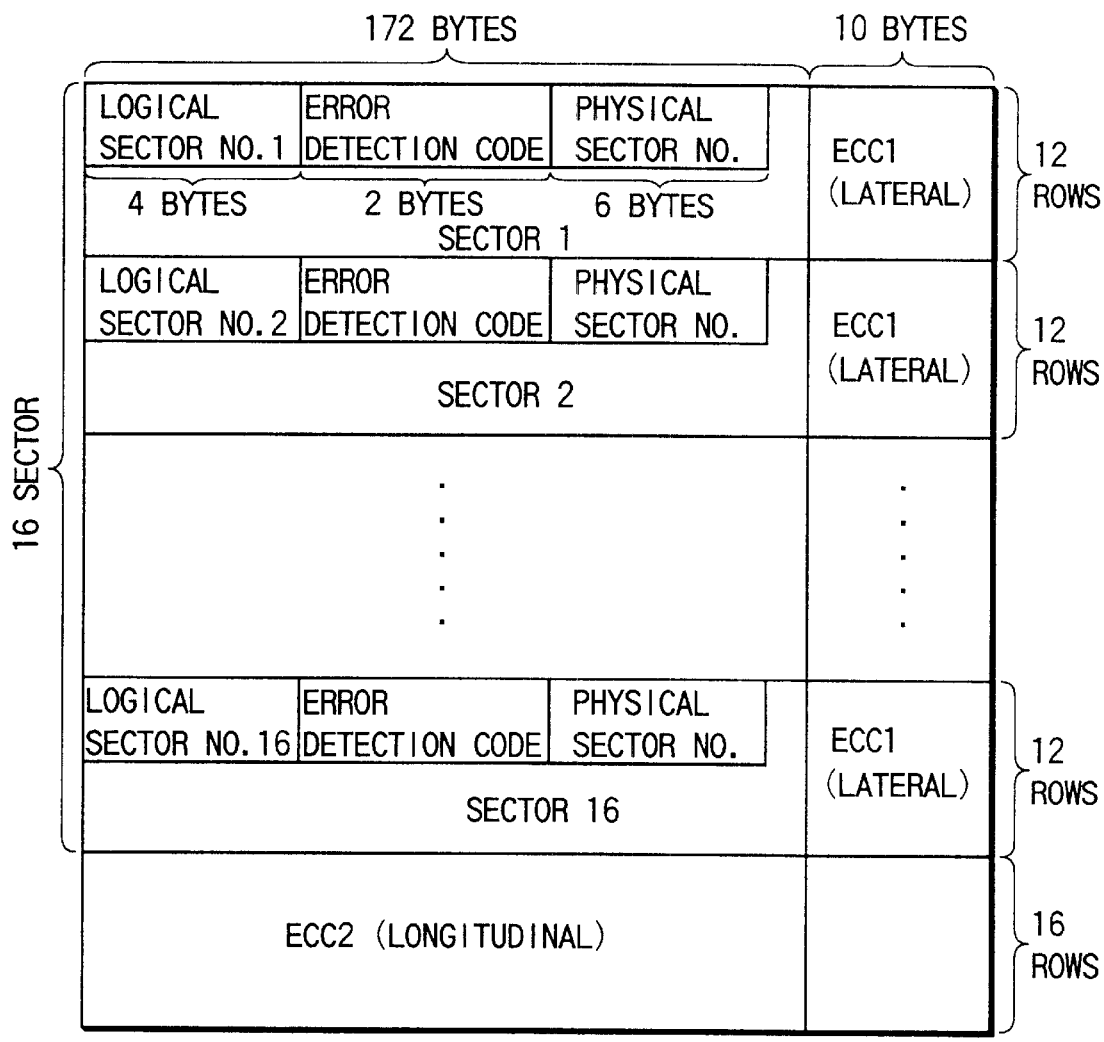
FIG. 5 is a diagram for illustrating the construction of an ECC block of the optical disk.

The ECC block includes 16 sectors into which 2 K byte data is recorded, and as shown in FIG. 5, sector ID (identification data) 1 to sector ID 16 of 4-byte (32 channel bit) configuration used as address data for each sector are attached to main data (sector data) together with error detection codes (IED: ID error detection code) of 2-byte configuration, and a lateral ECC (error correction code) 1 (inside code PI) and a longitudinal ECC 2 (outside code PO)

used as an error correction code for reproducing data recorded in the ECC block are recorded. The ECCs 1 and 2 are error correction codes attached to data as a redundancy word for preventing that data cannot be reproduced by the defect of the optical disk 1.

The sector ID (1 to 16) includes 1-byte sector information and 3-byte sector number (a logical sector number as a logical address indicating the logical position on the track). The sector information includes a 1-bit sector format type field, 1-bit tracking method field, 1-bit reflectance field, 1-bit reserve field, 2-bit area type field, 1-bit data type field, and 1-bit layer number field.

When "1" is recorded in the sector format type field, a zone format type is indicated. When "1" is recorded in the tracking method field, group tracking is indicated. When "1" is recorded in the reflectance field, the reflectance is indicated to be 40% or more. When "00" is recorded in the area type field, a data area is indicated, when "01" is recorded, the lead-in area is indicated, when "10" is recorded, the lead-out area is indicated, and when "11" is recorded, reserve is indicated. When "0" is recorded in the data type field, recording of read only data is indicated and when "1" is recorded, recording of rewritable data is indicated. When "0" is recorded in the layer number field, a layer 0 is indicated.

Further, a reserve field RSV (specification of DVD-RAM) of 6-byte configuration is prepared after the error detection code so that specified information can be recorded in this location according to the specific specification which will be set in the future. A physical sector number changed by the skipping process is recorded in the reserve field RSV.

Each sector is constructed by 12 rows of data of 172 bytes, the lateral ECC 1 of 10-byte configuration is attached for each row and the longitudinal ECC 2 of one row of 182-byte configuration is attached. As a result, an error correction circuit 32 which will be described later effects the error correction process for each line by use of the lateral ECC 1 and effects the error correction process for each column by use of the longitudinal ECC 2.

As shown in FIG. 6, when the ECC block is recorded on the optical disk 1, a synchronization code (2 bytes; 32 channel bits) is attached to attain byte synchronization for reproducing data for every preset data amount (for every preset data length interval, for example, 91 bytes; for every 1456 channel bits) of each sector.

Figure 7:
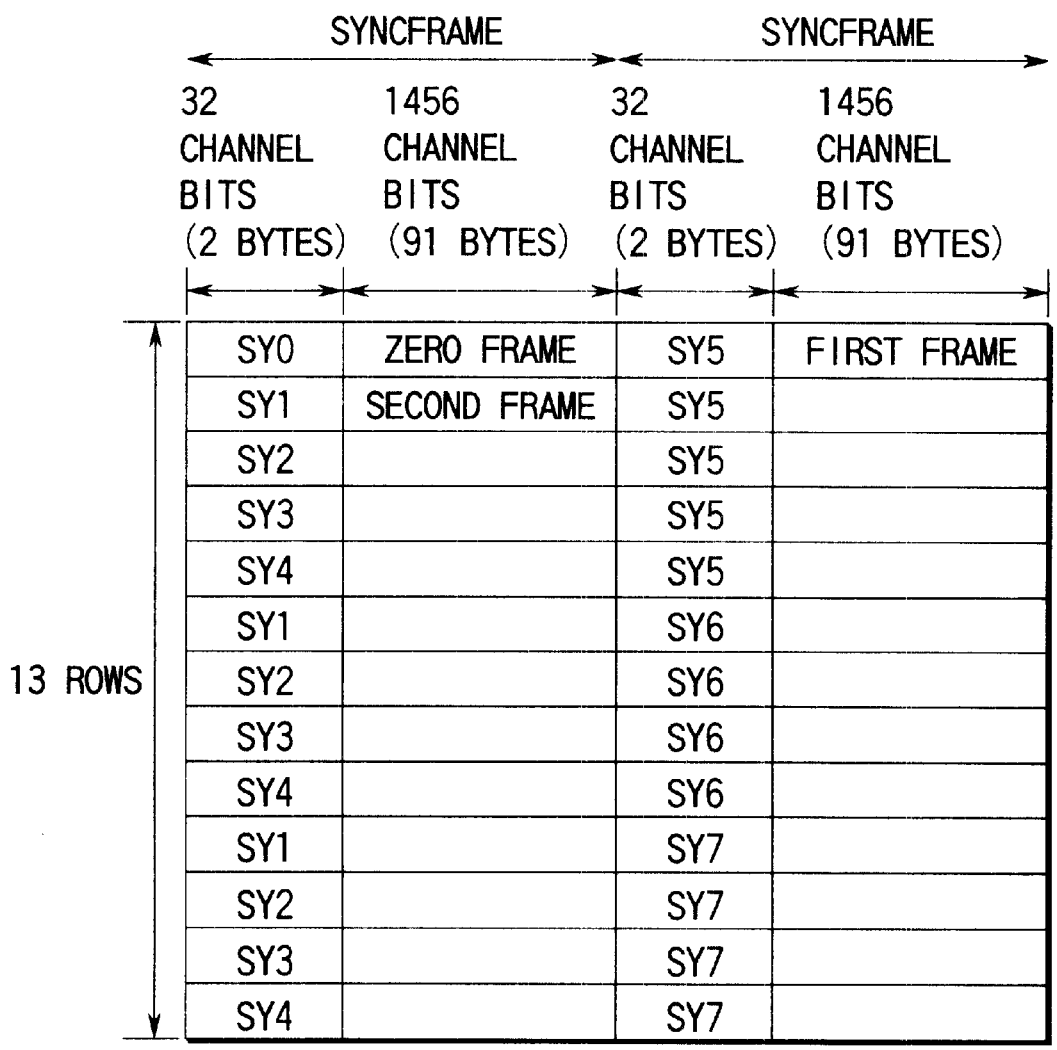
FIG. 7 is a diagram for illustrating the construction of each sector of the ECC block.

As shown in FIG. 7, each sector includes 26 frames ranging from a 0th frame to a 25th frame and a synchronization code (frame synchronization signal) attached to each frame includes a specified code (1 byte; 16 channel bits) for specifying a frame number and a common code (1 byte; 16 channel bits) common for each frame.

That is, as shown in FIG. 7, the 0th frame is SY0, the second, tenth and eighteenth frames are SY1, the fourth, twelfth and twentieth frames are SY2, the sixth, fourteenth and twenty-second frames are SY3, the eighth, sixteenth and twenty-fourth frames are SY4, the first, third, fifth, seventh and ninth frames are SY5, the eleventh, thirteenth, fifteenth and seventeenth frames are SY6, and the nineteenth, twenty-first, twenty-third and twenty-fifth frames are SY7.

As shown in FIG. 2, in the tracks of the zones 3a, . . . 3x of the data area 3, header sections 11 having addresses recorded therein are previously preformatted in the respective sectors.

Figure 8:
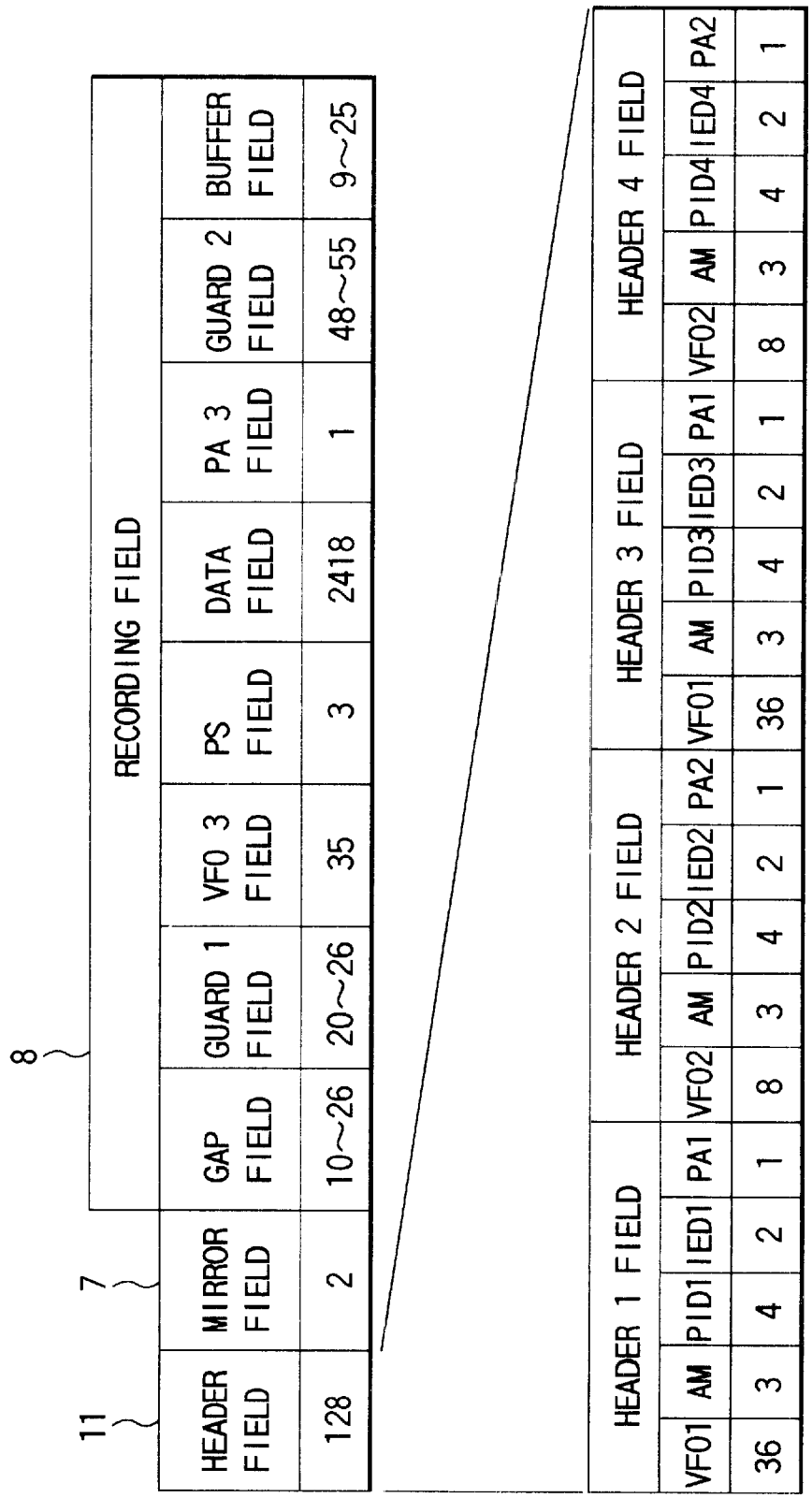
FIG. 8 is a diagram showing a sector format of the ECC block.

The format of each sector is shown in FIG. 8.

In FIG. 8, one sector is constructed by 2697 bytes and includes a 128-byte header field (corresponding to the header section 11) 11, 2-byte mirror field 7 and 2567-byte recording field 8.

The channel bits recorded in the sector are obtained in a form of 16-bit channel bits converted by subjecting 8-bit data to the 8–16 code modulation.

The header field 11 is an area in which preset data is recorded at the time of manufacturing of the optical disk 1. The header field 11 includes four fields of header 1 field, header 2 field, header 3 field and header 4 field.

The header 1 field to header 4 field are constructed by 46 bytes or 18 bytes and include 36-byte or 8-byte synchronization code section VFO (Variable Frequency Oscillator), 3-byte address mark AM (Address Mark), 4-byte address section PID (Position Identifier), 2-byte error detection code IED (ID Error Detection Code), and 1-byte postamble PA (Postambles).

The header 1 field, header 3 field have a 36-byte synchronization code section VFO1 and the header 2 field, header 4 field have an 8-byte synchronization code section VFO2.

The synchronization code sections VFO1, VFO2 are fields for pulling in the PLL (phase locked loop), the synchronization code section VFO1 is obtained by recording (recording patterns at regular intervals) "36" bytes (576 bits in terms of the channel bits) of the succession of "010 . . . " in the channel bits, and the synchronization code section VFO2 is obtained by recording "8" bytes (128 bits in terms of the channel bits) of the succession of "010 . . . " in the channel bits.

The address mark AM is a 3-byte synchronization code indicating a start position of the sector address. As the pattern of each byte of the address mark AM, a special pattern of "0100100000000100" which does not appear in the data portion is used.

The address sections PID1 to PID4 are fields in which sector addresses (containing the ID numbers) are recorded as 4-byte address information. The sector address is a physical sector number used as a physical address indicating the physical position on the track and since the physical sector number is recorded in the mastering process, it cannot be rewritten.

The ID number is "1" in the case of PID1, for example, and is a number indicating one of the four sheets which are overwritten by the header section 11.

The error detection code IED is an error detection code for the sector address (containing the ID number) and can detect whether or not an error is present in the readout PID.

The postamble PA contains state information necessary for demodulation and has a role of polarity adjustment to terminate the header section 11 at the space.

The mirror field 17 is used for offset correction of the tracking error signal, timing generation of the land/groove switching signal and the like.

The recording field 18 includes a 10- to 26-byte gap field, 20- to 26-byte guard 1 field, 35-byte VFO 3 field, 3^-byte pre-synchronous code (PS) field, 2418-byte data field, 1-byte postamble 3 (PA3) field, 48- to 55-byte guard 2 field and 9- to 25-byte buffer field.

The gap field is a field in which nothing is written.

The guard 1 field is a field for preventing the deterioration in the end portion caused at the time of repetitive recording inherent to the phase changing recording medium from influencing the VFO 3 field.

The VFO 3 field is also a PLL locking field and is a field for inserting a synchronization code in the same pattern to attain the synchronization with the byte boundary.

The PS (pre-synchronous code) field is a synchronizing field for connection to the data field.

The data field is a field in which the sector data is recorded.

The PA (postamble) 3 field is a field containing state information necessary for demodulation and indicating the end of the final byte in the preceding data field.

The guard 2 field is a field for preventing the deterioration in the end portion caused at the time of repetitive recording inherent to the phase changing recording medium from influencing the data field.

The buffer field is a field for absorbing a variation in the rotation of the motor for rotating the optical disk 1 so as to prevent the data field from extending into the next header section 11.

The reason why the gap field is of 10 to 26 bytes is that the random shift is effected. The random shift is to shift the data writing start position in order to reduce the deterioration due to repetitive recording of the phase changing recording medium. The length of the random shift is adjusted according to the length of the buffer field lying in the last position of the data field and the length of one whole sector is 2697 bytes and constant.

Further, the optical disk apparatus 10 is explained with reference to FIG. 1.

The basic function of the optical disk apparatus 10.

In the optical disk apparatus 10, a converged light spot is used to record or re-write (containing a data erasing process) new data on a preset position of the optical disk 1.

Further, a converged light spot is used to reproduce recorded data from a preset position of the optical disk 1 in the optical disk apparatus 10.

Basic function attaining means of the optical disk apparatus 10.

As the means for attaining the above basic functions, the following three operations are effected in the optical disk apparatus 10.

A converged light spot is traced along the track (not shown) on the optical disk 1.

An amount of light of the converged light spot applied to the optical disk 1 is changed to switch recording/reproducing/erasing of data.

A recording signal d supplied from the exterior is converted into an optimum signal so as to be recorded at high density and low error rate.

Signal detection by the optical head 12.

The optical head 12 is basically constructed by a semiconductor laser which is a light source, a photodetector and an objective lens although they are not shown in the drawing.

Laser light emitted from the semiconductor laser is converged on the optical disk 1 by the objective lens. The laser light reflected from the light reflection film or light reflective recording film of the optical disk 1 is photoelectrically converted by the photodetector.

A detection current obtained in the photodetector is subjected to current-voltage conversion and converted to a detection signal in an amplifier 13. The detection signal is processed by a focus/track error detection circuit 14 or binary coding circuit 15. Generally, the photodetector is divided into a plurality of light detection areas to individually detect a variation in the amount of light applied to each light detection area. The operations for adding and subtracting the detection signals are effected to detect a focus deviation and track deviation in the focus/track error detection 14. A signal on the optical disk 1 is reproduced by detecting a variation in the amount of reflection light from the light reflection film or light reflective recording film of the optical disk 1.

Focus deviation detecting method

As the method for optically detecting the focus deviation, an astigmatism method or knife-edge method is proposed.

The astigmatism method is a method for detecting a change in the shape of the laser light applied on the photodetector by use of an optical element (not shown) used for causing astigmatism and arranged on the detection optical path of the laser light reflected from the light reflection film or light reflective recording film of the optical disk 1. The light detection area is divided into four sections by diagonal lines. A focus error detection signal is obtained by deriving a difference between the sum of the detection signals of the detection areas on one of the diagonal positions and the sum of the detection signals of the detection areas of the other diagonal position in the focus/track error detection circuit 14 for the detection signals obtained from the respective detection areas.

The knife-edge method is a method using a knife-edge asymmetrically arranged with respect to the laser light reflected from the optical disk 1 to shield part of the laser light. The light detection area is divided into two sections and a focus error detection signal is obtained by deriving a difference between the detection signals from the two light detection areas.

Track deviation detecting method

The optical disk 1 has a spiral track or concentric tracks and data is recorded on the track. A converged light spot is traced along the track to reproduce or record/erase data. In order to stably trace the converged light spot along the track, it is necessary to optically detect the relative positional deviation between the track and the converged light spot.

As the track deviation detecting method, generally, a DPD (Differential Phase Detection) method, push-pull method or twin spot method is provided.

The DPD method is to detect a variation in the intensity distribution of the laser light on the photodetector which is reflected from the light reflection film or light reflective recording film of the optical disk 1. The light detection area is divided into four sections by diagonal lines. A track error detection signal is obtained by deriving a difference between the sum of the detection signals of the detection areas on one of the diagonal positions and the sum of the detection signals of the detection areas of the other diagonal position in the focus/track error detection circuit 14 for the detection signals obtained from the respective detection areas.

The push-pull method is to detect a variation in the intensity distribution of the laser light reflected from the optical disk 1 on the photodetector. The light detection area is divided into two sections and a track error signal is obtained by deriving a difference between the detection signals from the respective light detection areas.

The twin-spot method is to arrange a light diffraction element or the like in the light transmission system between the semiconductor laser element and the optical disk 1 to divide light into a plurality of wave fronts and detect a variation in the reflected light amount of ±primary diffraction light applied to the optical disk 1. Light detection areas for separately detecting the reflected light amount of +primary diffraction light and the reflected light amount of −primary diffraction light are disposed separately from the light detection area for detection of the reproducing signal and a track error detection signal is obtained by deriving a difference between the above detection signals.

Objective lens actuator structure

An objective lens (not show) for converging the laser light emitted from the semiconductor laser element on the optical disk 1 has such a structure as to be moved in two axial directions according to an output current of the objective lens actuator driving circuit 16. The objective lens moves in a direction perpendicular to the optical disk 1 for correction of the focus deviation and in a radial direction of the optical disk 1 for correction of the track deviation. Although not shown in the drawing, the moving mechanism of the objective lens is called an objective lens actuator.

As the objective lens actuator structure, an axial sliding system or four-wire system is widely used. In either system, a permanent magnet and a coil are provided and the blade is moved by causing a current to flow into the coil connected to the blade.

The axial sliding system is a system in which the blade integrally formed with the objective lens is moved along the central axis (shaft) and the blade is moved in a direction along the central axis to correct the focus deviation and the blade is rotated with the central axis set as a reference to correct the track error deviation.

The four-wire system is a system in which the blade integrally formed with the objective lens is connected to a fixed system via four wires and the blade is moved in two axial directions by use of elastic deformation of the wires.

Rotation control system of the optical disk 1.

The optical disk 1 is mounted on a rotating table 18 rotated by driving force of a spindle motor 17.

The rotation speed of the optical disk 1 is detected based on the reproduction signal obtained from the optical disk 1. That is, a detection signal (analog signal) output from the amplifier 13 is converted into a digital signal by the binary coding circuit 15 and a signal of constant frequency (reference clock signal) is generated based on the above signal by a PLL circuit 19. A rotation speed detection circuit 20 uses the thus obtained signal to detect the rotation speed of the optical disk 1 and outputs the value thereof.

A correspondence table indicating the rotation speeds corresponding to radial positions for reproduction or recording/erasing on the optical disk 1 is previously recorded in a semiconductor memory 21. If a reproduction position or recording/erasing position is determined, a controller 22 refers to data of the semiconductor memory 21, sets the target rotation speed of the optical disk 1 and notifies the value to the spindle motor driving circuit 23.

In the spindle motor driving circuit 23, a difference between the target rotation speed and the output signal (current rotation speed) of the rotation speed detection circuit 20 is derived and a driving current corresponding to the result is supplied to the spindle motor 17 so as to control the rotation speed of the spindle motor 17 to a constant value. An output signal of the rotation speed detection circuit 20 is a pulse signal having a frequency corresponding to the rotation speed of the optical disk 1 and the spindle motor driving circuit 23 controls both of the frequency and pulse phase of the pulse signal.

Optical head moving mechanism

An optical head moving mechanism (feeding motor) 24 for moving the optical head 12 in the radial direction of the optical disk 1 is provided.

A rod-like guide shaft is often used as the guide mechanism for moving the optical head 12 and the optical head 12 is moved by use of friction between a bush mounted on part of the optical head 12 and the guide shaft. Further, a method using a bearing for alleviating the friction force using the rotation movement is provided.

The driving force transmission method for moving the optical head 12 can be attained by disposing a rotating motor with a pinion (rotating gear) on the fixed system and a rack which is a linear gear engaged with the pinion on the side surface of the optical head 12 although they are not shown in the drawing so as to convert the rotation movement of the rotating motor into a linear movement of the optical head 12. Further, as the other driving force transmission method, a linear motor system for disposing a permanent magnet on the fixed system and supplying a current to a coil arranged on the optical head 12 to linearly move the optical head 12 may be used.

In either method using the rotating motor or linear motor, a current is basically supplied to the feeding motor to generate driving force for moving the optical head 12. The driving current is supplied from the feeding motor driving circuit 25.

Converged light spot trace control

In order to correct the focus deviation or track deviation, the objective lens actuator driving circuit 16 is used as a circuit for supplying the driving current to an objective lens actuator (not shown) in the optical head 12 according to an output signal (detection signal) of the focus/track error detection circuit 14. In order to make the movement of the objective lens responsive at high speed up to the high frequency range, a phase compensation circuit for improving the characteristic according to the frequency characteristic of the objective lens actuator is contained therein.

In the objective lens actuator driving circuit 16, the ON/OFF process of the focus/track deviation correcting operation (focus/track loop), the process (effected at the OFF time of the focus/track loop) for moving the objective lens at low speed in the vertical direction (focus direction) of the optical disk 1, and the process for moving the converged light spot to the adjacent track by slightly moving the converged light spot in the radial direction (in a direction across the track) of the optical disk 1 by use of a kick pulse are effected in response to an instruction of the controller 22.

Switching process of laser light amount in the reproducing and recording/erasing operations The switching process for the reproducing and recording/erasing operations is effected by changing the light amount of the converged light spot applied to the optical disk 1.

Generally, the following relation is satisfied for the optical disk 1 using the phase changing system.

[light amount at the recording time]>[light amount at the erasing time]>[light amount at the reproduction time]

Generally, the following relation is satisfied for the optical disk 1 using the optical-magnetic system.

[light amount at the recording time]≈[light amount at the erasing time]>[light amount at the reproduction time]

In the case of optical-magnetic system, the recording and erasing operations are controlled by changing the polarity of an external magnetic field (not shown) applied to the optical disk 1 at the time of recording/erasing.

At the time of data reproduction, a constant light amount is continuously applied to the optical disk 1.

When new data is recorded, an intermittent light amount in a pulse form is superposed on the light amount at the time of reproduction. When the semiconductor laser element emits pulse-like light with a large light amount, the light reflective recording film of the optical disk 1 is partially optically changed or deformed to form a recording mark. When data is written on the already recorded data, the semiconductor laser element is also driven to emit pulse-like light.

When already recorded data is erased, a constant amount of light larger than that at the time of reproduction is continuously applied. When data is continuously erased, the amount of light applied is set back to that at the time of reproduction for each specified period, for example, for each sector unit and reproduction of data is intermittently effected in parallel with the erasing process. The track number and address of the track to be intermittently erased are reproduced and the erasing process is effected while confirming that no error of the erasing track occurs.

Laser light emission control

A photodetector for detecting the emitted light amount of the semiconductor laser element is contained in the optical head 12 although not shown in the drawing. In a semiconductor laser driving circuit 26, a difference between the output (detection signal of the emitted light amount of the semiconductor laser element) of the photodetector and a light emission reference signal generated from a recording/reproduction/erasing control waveform generating circuit 27 is derived and a driving current is fed back to the semiconductor laser based on the result.

Start control

When the optical disk 1 is mounted on the rotating table 18 and the start control is effected, the process is effected according to the following procedure.

1) A target rotation speed is supplied from the controller 22 to the spindle motor driving circuit 23 and a driving current is supplied from the spindle motor driving circuit 23 to the spindle motor 17 to start the rotation of the spindle motor 17.

2) At the same time, a command (execution instruction) is issued from the controller 22 to the feeding motor driving circuit 25 and a driving current is supplied from the feeding motor driving circuit 25 to the optical head driving mechanism (feeding motor) 24 to move the optical head 12 to the innermost peripheral position of the optical disk 1. It should be confirmed here that the optical head 12 exceeds the area on which data of the optical disk 1 is recorded and is set in the inner peripheral portion.

3) When the rotation speed of the spindle motor 17 has reached the target rotation speed, the status (status report) thereof is issued to the controller 22.

4) A current is supplied from the semiconductor laser driving circuit 26 to the semiconductor laser element in the optical head 12 according to the reproduction light amount signal supplied from the controller 22 to the recording/reproduction/erasing control waveform generating circuit 27 so as to start light emission.

The optimum amount of light applied at the time of reproduction is different according to the type of the optical disk 1. At the start time, the amount of applied light is set to the smallest value.

5) The objective lens actuator driving circuit 16 effects the control operation according to a command from the controller 22 so that the objective lens (not shown) in the optical head 12 will be set to a position farthest apart from the optical disk 1 and then slowly moved towards the optical disk 1.

6) At the same time, the focus deviation amount is monitored by use of the focus/track error detection circuit 14, the status is issued when the objective lens comes to a position near the focused position, and the present status is notified to the controller 22.

7) When the controller 22 receives the notification, it issues a command to the objective lens actuator driving circuit 16 to set the focus loop into the ON state.

8) The controller 22 issues a command to the feeding motor driving circuit 25 with the focus loop kept in the ON state and slowly moves the optical head 12 towards the external peripheral portion of the optical disk 1.

9) At the same time, the reproduction signal from the optical head 12 is monitored and the movement of the optical head 12 is stopped when the optical head 12 reaches the recording area on the optical disk 1, and a command for setting the track loop into the ON state is issued to the objective lens actuator driving circuit 16.

10) The "optimum light amount at the time of reproduction" and "optimum light amount at the time of recording/erasing" recorded on the inner peripheral portion of the optical disk 1 are reproduced and the data is recorded into the semiconductor memory 21 via the controller 22.

11) Further, in the controller 22, a signal set according to the "optimum light amount at the time of reproduction" is supplied to the recording/reproduction/erasing control waveform generating circuit 27 to re-set the emission light amount of the semiconductor laser element at the time of reproduction.

12) The light emission amount of the semiconductor laser element at the time of recording/erasing is set according to the "optimum light amount at the time of recording/erasing" recorded in the optical disk 1.

Reproduction of data of access destination on the optical disk 1

Data indicating the contents and location of data recorded on the optical disk 1 is different depending on the type of the optical disk 1 and the data is generally stored in the navigation pack or directory management area in the optical disk 1.

The directory management area is collectively recorded on the inner peripheral portion or outer peripheral portion of the optical disk 1.

The navigation pack is contained in VOBS (video object set) which is in conformity with the data structure of PS (program stream) of MPEG2 and data indicating the recording location of a next image is recorded therein.

When specified data is reproduced or recorded/erased, data in the above area is first reproduced and the access destination is determined based on the data thus obtained.

Rough access control

The radial position of the access destination is derived by calculation in the controller 22 and a distance with respect to the present position of the optical head 12 is derived.

Speed curve data indicating the shortest time for the traveling distance of the optical head 12 is previously recorded in the semiconductor memory 21. The controller 22 reads out the data and controls the movement of the optical head 12 according to the speed curve by the following method.

A command is issued from the controller 22 to the objective lens actuator driving circuit 16 to set the track loop into the OFF state and then the feeding motor driving circuit 25 is controlled to start to move the optical head 12.

When the converged light spot crosses the track on the optical disk 1, a track error detection signal is generated in the focus/track error detection circuit 14. The relative speed of the converged light spot with respect to the optical disk 1 can be detected by use of the track error detection signal.

In the feeding motor driving circuit 25, a difference between the relative sped of the converged light spot obtained from the focus/track error detection circuit 14 and the target speed data sequentially supplied from the controller 22 is derived and the result thereof is fed back to the driving current to the optical head driving mechanism (feeding motor) 24 to move the optical head 12.

Friction force is always applied between the guide shaft and the bush or bearing as described in "Optical head moving mechanism". When the optical head 12 is moved at high speed, the dynamic friction acts, but at the starting time of movement and immediately before stop, the optical head 12 moves at low speed and the static friction occurs. At this time, since relative friction force is increased (particularly, immediately before stop), the current amplification factor (gain) of the current supplied to the optical head driving mechanism (feeding motor) 24 is increased according to the command from the controller 22.

Fine access control

When the optical head 12 reaches the target position, a command is issued from the controller 22 to the objective lens actuator driving circuit 16 to set the track loop into the ON state.

The converged light spot is traced along the track on the optical disk 1 to reproduce the address or track number of the traced portion.

The present converged light spot position is derived based on the address or track number of the traced portion and a difference in the track number from the target position is calculated in the controller 22 and the number of tracks necessary for the movement of the converged light spot is notified to the objective lens actuator driving circuit 16.

When one set of kick pulses are generated in the objective lens actuator driving circuit 16, the objective lens is slightly moved in the radial direction of the optical disk 1 to move the converged light spot to the adjacent track.

The track loop is temporarily set into the OFF state in the objective lens actuator driving circuit 16, and after kick pulses are generated by a number of times corresponding to data from the controller 22, the track loop is set into the ON state again.

After completion of the fine access control, the controller 22 reproduces data (address or track number) in the position traced by the converged light spot and confirms that the target track is accessed.

Continuous recording/reproducing/erasing control

A track error detection signal output from the focus/track error detection circuit 14 is input to the feeding motor driving circuit 25. The controller 22 effects the control operation so that the track error detection signal will not be used in the feeding motor driving circuit 25 at the time of "start control" and "access control" described before.

After it is confirmed that the converged light spot has reached the target position by access, part of the track error detection signal is supplied as a driving current to the optical head driving mechanism (feeding motor) 24 via the feeding motor driving circuit 25 in response to a command from the controller 22. The control operation is continuously effected while the continuous reproduction or recording/erasing process is being effected.

The optical disk 1 is mounted with its central position slightly eccentrically set from the central position of the rotating table 18. When part of the track error detection signal is supplied as the driving current, the whole portion of the optical head 12 slightly vibrates due to the eccentricity.

When the reproducing or recording/erasing process is effected for a long period of time, the converged light spot is gradually moved outwardly or inwardly. When part of the track error detection signal is supplied as the driving current to the optical head driving mechanism (feeding motor) 24, the optical head 12 is gradually moved outwardly or inwardly accordingly.

Thus, the load of the objective lens actuator for correction of the track deviation can be alleviated and the track loop can be stabilized.

Termination control

In order to terminate the operation after a series of processes is completed, the process is effected according to the following procedure.

1) A command for setting the track loop into the OFF state is issued from the controller 22 to the objective lens actuator driving circuit 16.

2) A command for setting the focus loop into the OFF state is issued from the controller 22 to the objective lens actuator driving circuit 16.

3) A command for terminating light emission of the semiconductor laser element is issued from the controller 22 to the recording/reproducing/erasing control waveform generating circuit 27.

4) "0" is notified as the reference rotation speed to the spindle motor driving circuit 23.

Signal format recorded on the optical disk 1

In order to satisfy the following three requirements for the signal recorded on the optical disk 1, "addition of error correction function" and "signal conversion (signal modulation/demodulation) for record data" are effected in the optical disk apparatus 10.

(1) Correction of a record data error caused by a defect on the optical disk 1 is made possible.

(2) A DC component of the reproduced signal is set to "0" to simplify the reproduction processing circuit.

(3) Data is recorded on the optical disk 1 with maximum possible density.

ECC (Error Correction Code) adding process

Data (from the external device) which is desired to be recorded on the optical disk 1 is input to the data input/output interface section 30 as a recording signal d in the form of live signal. The recording signal d is recorded in the semiconductor memory 21 as it is and then the ECC adding process is effected in an ECC encoding circuit 29 as follows.

An example of the ECC adding method using a product code is explained below.

The recording signal d is sequentially arranged for every 172 bytes on each row in the semiconductor memory 21 and one set of ECC block is constructed by 192 rows. An inside code PI (ECC 1) of 10 bytes is calculated for each row of 172 bytes for the live signal (recording signal d) in one set of ECC block constructed by "rows: 172×columns: 192 bytes" and additionally recorded in the semiconductor memory 21. Further, an outside code PO (ECC 2) of 16 bytes is calculated for each column in the byte unit and additionally recorded in the semiconductor memory 21.

In an example in which data is recorded on the optical disk 1, data is recorded in one sector of the optical disk 1 in the unit of 2366 bytes in total for 12 rows containing the inside code PI and one row of the outside code PO (2366= (12+1)×(172+10)).

In the ECC encoding circuit 29, when addition of the inside code PI and outside code PO is completed, a signal is read out from the semiconductor memory 21 for every 2366 bytes of one sector and transferred to a modulation circuit 28.

Signal modulation

In order to set a DC component (DSV: Digital Sum Value) of the reproduced signal closer to "0" and record data on the optical disk 1 at high density, signal modulation which is conversion of the signal format is effected in the modulation circuit 28.

A conversion table indicating the relation between the original signals and signals after modulation is stored in the modulation circuit 28 and demodulation circuit 31. A signal transferred from the ECC encoding circuit 29 is divided for every plurality of bits according to the modulation system and converted into another signal (code) while referring to the conversion table.

For example, when 8/16 modulation (RLL(2, 10) code) is used as the modulation system, two types of conversion tables are present and the reference conversion table is adequately changed to set the DC component (DSV: Digital Sum Value) after modulation closer to "0".

Generation of recording waveform

When a recording mark is recorded on the optical disk 1, the following two types of recording systems are generally provided.

Mark-length recording system: "1" comes at the front-end position and rear-end position of the recording mark; and Inter-mark recording system: the central position of the recording mark coincides with the position of "1".

In the case of the mark-length recording system, it is necessary to form a long recording mark. In this case, if recording light is continuously applied for a preset period of time, a recording mark is formed in a "raindrop" form in which only the latter portion has a large width because of the heat storage effect of the light reflective recording film of the optical disk 1. In order to solve this problem, a plurality of recording pulses are used or a recording waveform is changed in a stepwise form when the long recording mark is formed.

In the recording/reproducing/erasing control waveform generating circuit 27, the recording waveform as described above is formed according to the recording signal supplied from the modulation circuit 28 and is transmitted to the semiconductor laser driving circuit 26.

Binary coding/PLL circuit

A signal on the optical disk 1 is reproduced by detecting a variation in the light amount reflected from the light reflection film or light reflective recording film of the optical disk 1 as described in "Signal detection by the optical head". A signal obtained from the amplifier 13 is an analog waveform. The signal is converted into a binary digital signal constructed by "1" and "0" by use of a comparator in the binary coding circuit 15.

A reference signal used at the time of data reproduction is extracted from the thus reproduced signal in the PLL circuit 19. The PLL circuit 19 contains a variable frequency oscillator. The frequencies and phases of a pulse signal (reference clock) output from the oscillator and an output signal of the binary coding circuit 15 are compared and the results of comparison are fed back to the oscillator output.

Signal demodulation

A signal conversion table indicating the relation between the modulated signals and the signals after demodulation is stored in the demodulation circuit 31. The signal is restored to an original signal while referring to the conversion table according to the reference clock obtained in the PLL circuit 19. The restored (demodulated) signal is recorded in the semiconductor memory 21.

Error correction process

An erroneous portion is detected in the signal recorded in the semiconductor memory 21 by use of the inside code PI and outside code PO and a pointer flag of the erroneous portion is set.

Then, a signal in the erroneous portion is sequentially corrected according to the error pointer flag while reading out the signal from the semiconductor memory 21, the inside code PI and outside code PO are removed from the signal and then the signal is transferred to the data input/output interface section 30.

A signal supplied from the ECC encoding circuit 29 is output to the external device (not shown) from the data input/output interface section 30 as a reproduction signal c.

In the semiconductor memory 21, a defect data table 21a in which defect data recorded in the defect management zone 6a of the optical disk 1 is stored is provided. Defect data recorded in the defect management zone 6a of the optical disk 1 is reproduced and stored into the defect data table 21a when the optical disk 1 is mounted on the optical disk apparatus 10.

The controller 22 causes data indicating the power OFF in the course of recording to be recorded in the data base in the application software of the optical disk 1 by use of a battery (not shown) when the power supply is turned OFF in the course of recording.

At the time of mounting of the optical disk 1 or at the time of turn ON of the power supply, the controller 22 determines that the power OFF occurs in the course of recording and effects the searching process of the defective sector relating to the recording when it reads data indicating the power OFF caused during the recording process and recorded in the data base of the application software of the optical disk 1.

When data is recorded in the sector unit at the time of data recording, the controller 22 records data into a corresponding sector if two or more of the address sections of the four header fields in the header section 11 can be read and determines the sector as a defective sector if less than two (1 or 0) address sections can be read.

The controller 22 determines that an error due to a scratch or dust on the optical disk, that is a defective sector occurs when a digital signal obtained by converting a detection signal from the amplifier 13 by use of an analog-digital converter (not shown) becomes low during the recording process of data into a preset sector. This determination can be made to detect an error not only in the header section 11 but also in the recording field 8.

It is satisfactory if at least one of the above two determinations for the defective sector is provided.

Figure 9:
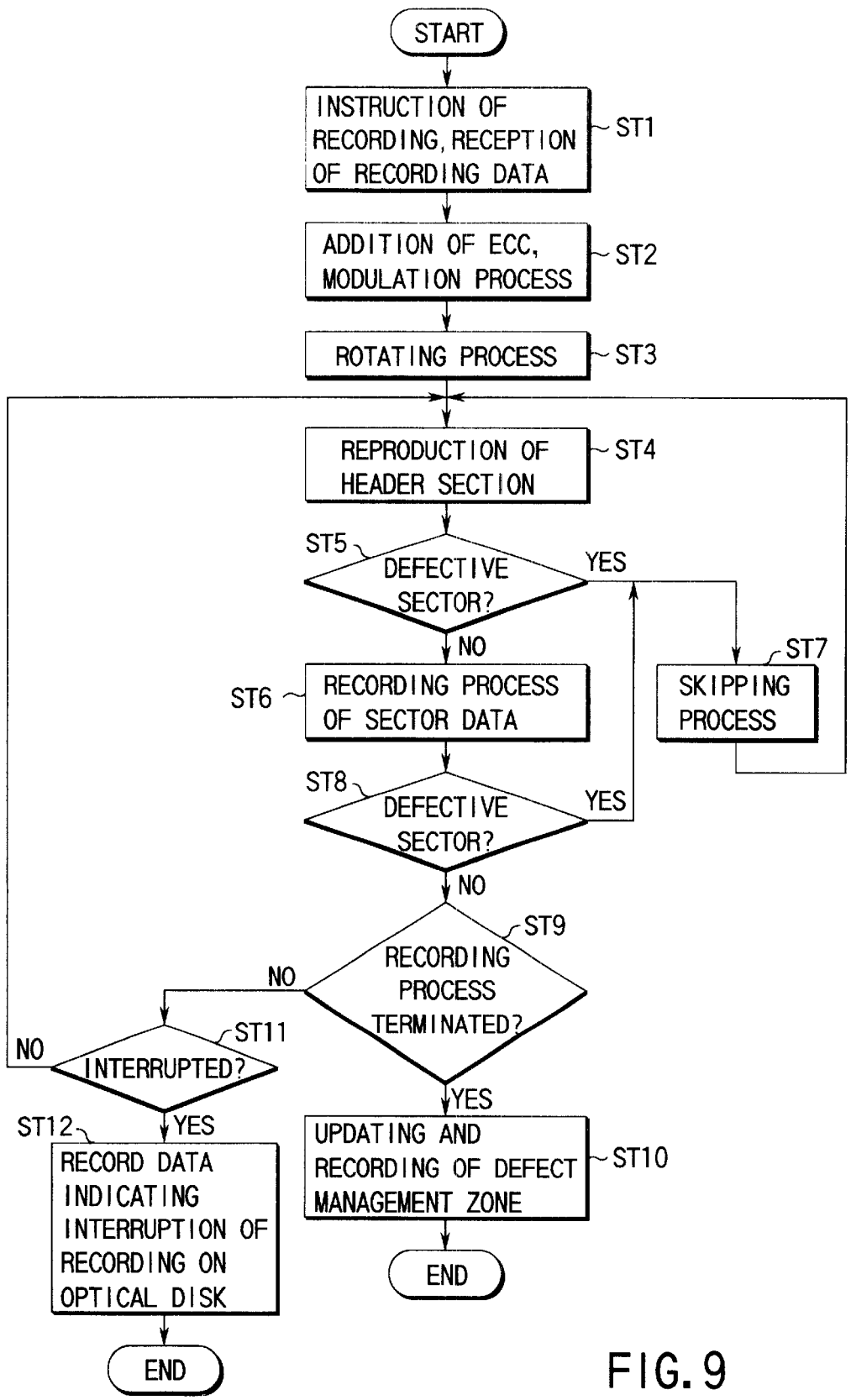
FIG. 9 is a flowchart for illustrating the process for continuously recording data such as moving pictures.
Figure 10:
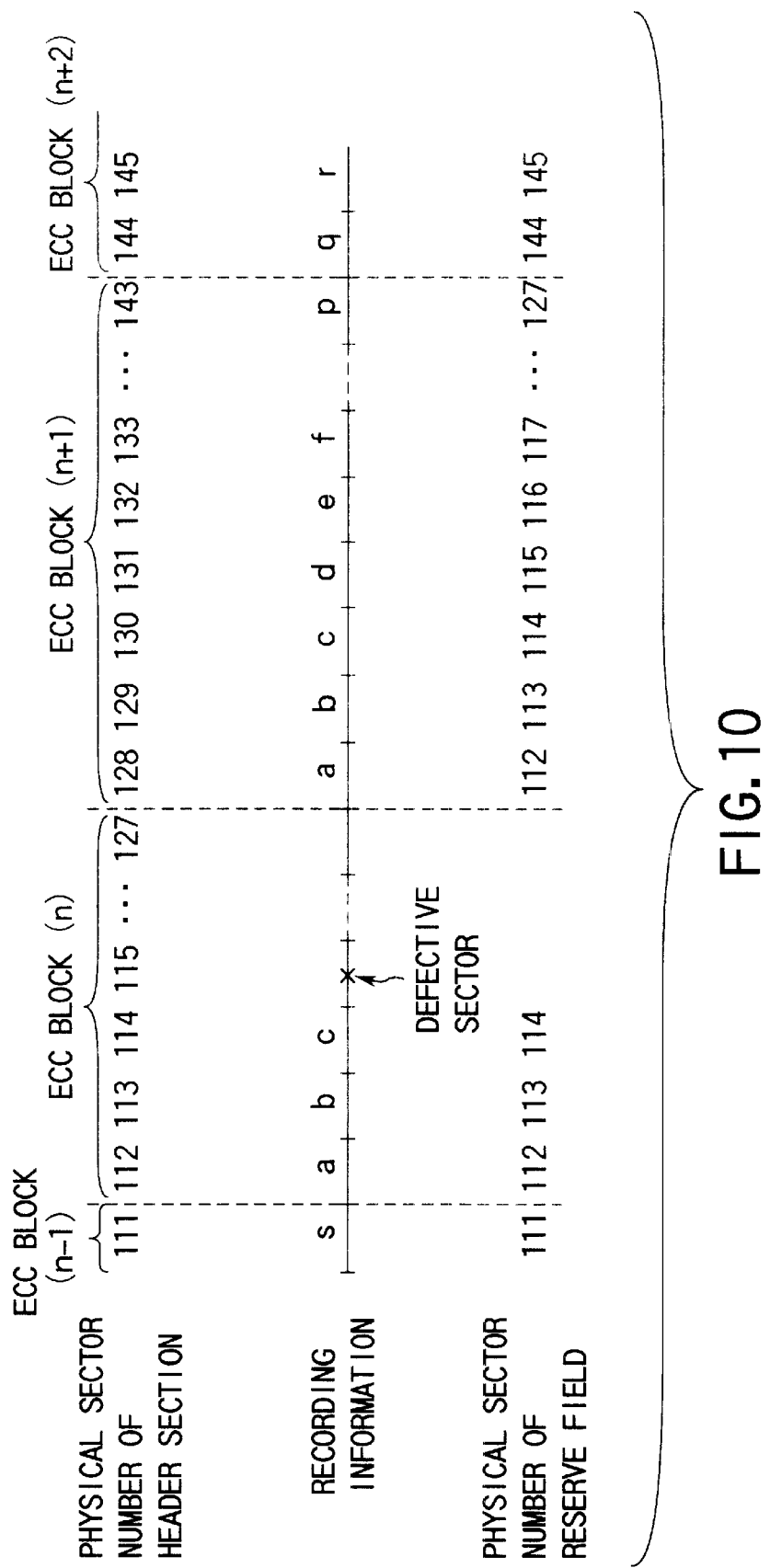

Next, the process for continuously recording moving pictures or the like is explained with reference to the flowchart shown in FIG. 9 and a diagram shown in FIG. 10.

For example, a recording signal d and an instruction of continuous recording of moving picture data from a preset ECC block in the data area 3 of the optical disk 1 are supplied from the external device to the optical disk apparatus 10 via the data input/output interface section 30 (ST1). Then, the instruction of continuous recording of the moving picture data into the preset ECC block is supplied to the controller 22 and the recording signal d is recorded into the semiconductor memory 21 as it is, and then the ECC adding process is effected in the ECC encoding circuit 29 (ST2). A signal transferred from the ECC encoding circuit 29 is divided for every plurality of bits according to the modulation system by the modulation circuit 28, converted into another signal (code) with reference to the conversion table and then supplied to the recording/reproduction/erasing control waveform generating circuit 27 (ST2).

Further, the controller 22 rotates the optical disk 1 at a rotation speed corresponding to the zone in which the ECC block to be recorded is contained (ST3).

In this state, if the header section 11 which lies in the head sector of the ECC block is reproduced (ST4), the controller 22 determines whether or not the sector is a defective sector by detecting whether or not the sector is correctly read according to whether or not two or more of the four physical sector numbers of the header section 11 are reproduced (ST5). When the defective sector is determined, the controller 22 stores the physical sector number of the defective sector into the defect data table 21a of the semiconductor memory 21. At this time, the recording/reproduction/erasing control waveform generating circuit 27 converts the data format (first one sector) of the ECC block used as record data into format data of a recording ECC block to which an ECC block synchronization code is attached under the control by the controller 22, subjects the same to the 8–16 code modulation and supplies the result of modulation to the semiconductor laser driving circuit 26. The semiconductor laser element in the optical head 12 is driven by the semiconductor laser driving circuit 26 so as to apply laser light corresponding to the modulation signal of ECC block format data to the optical disk 1. As a result, data is recorded on the head sector of the preset ECC block of the data area 3 in the optical disk 1 (ST6). At this time, the physical block number of the header section 11 is recorded into the reserve field RSV in the recorded sector by the controller 22.

After this, data of sector unit is recorded in the same manner as described above (ST4 to ST6) each time a physical sector number corresponding to a next physical sector number specified by the controller 22 is reproduced from the optical disk 1.

Further, when the presence of the defective sector is determined in the step ST5, the controller 22 skips the ECC block containing the above sector (ST7) and sequentially records data starting from the head sector of a next ECC block (ST4 to ST6).

At this time, a physical block number obtained by adding an amount of one ECC block, that is, 16 sectors to the physical block number of the header section 11 is recorded in the reserve field RSV in each sector of an ECC block next to the skipped ECC block by the controller 22.

After this, each time a defective sector is detected, a corresponding ECC block is skipped and data is sequentially recorded starting from the head sector of a next ECC block.

Further, when the detection signal of the amplifier 13 is lowered by the scratch or dust on the optical disk 1, the controller 22 determines that the sector is a defective sector (ST8), skips the ECC block containing the above sector (ST7), and sequentially records data starting from the head sector of a next ECC block (ST4 to ST6).

At this time, a physical block number obtained by adding an amount of one ECC block, that is, 16 sectors to the physical block number of the header section 11 is recorded in the reserve field RSV in each sector of an ECC block next to the skipped ECC block by the controller 22.

When the recording process of moving picture data is completed (ST9), the controller 22 records the physical block number of the sector determined as the defective sector recorded in the defect data table 21a of the semiconductor memory 21 into the defect management zone 6a of the optical disk 1 (ST10).

When the power supply is turned OFF in the course of recording of moving picture data (ST11), the controller 22 records data indicating turn-OFF of the power supply caused in the course of recording into the data base of the application software of the optical disk 1 (ST12).

When the optical disk 1 is mounted on the optical disk apparatus 10 or the power supply is turned ON and if the controller 22 reads the data indicating turn-OFF of the power supply caused in the course of recording and recorded in the data base of the application software of the optical disk 1, controller 22 determines that the power supply is turned OFF in the course of recording and effects the searching process for the defective sector relating to the recording.

That is, the controller 22 reproduces the physical block number recorded in the reserve field RSV in each sector, compares the reproduced physical block number with the physical block number of the corresponding header section 11, determines skipping of the corresponding ECC block at the time of non-coincidence, determines a sector next to the final sector whose block number is recorded in the reserve field RSV of the sector of the ECC block which is determined to be skipped as a defective sector, and records the physical block number of the sector into the defect management zone 6a of the optical disk 1.

In this state, moving pictures up to the interruption can be correctly reproduced by reproducing the moving picture data while skipping the ECC block containing the defective sector read out from the defect management zone 6a when moving picture data which is interrupted during the recording process as described above is reproduced.

If a defective sector is detected in the optical disk 1 in which data is recorded in the ECC block unit constructed by 16 sectors as described above, the recording process is effected while skipping an ECC block containing the defective sector and a physical block number obtained by adding an amount of 16 sectors for each skipping process is recorded into the reserve field RSV in each sector of a next ECC block.

As a result, continuous data such as moving pictures can be recorded in the ECC block unit, an ECC block containing the defective sector can be detected later in a case wherein the power supply is turned OFF by mistake or power failure in the course of recording when the recording process is effected while skipping an ECC block containing a defective sector, and data recorded up to the interruption can be reproduced without being influenced by the defective sector.

Figure 11:
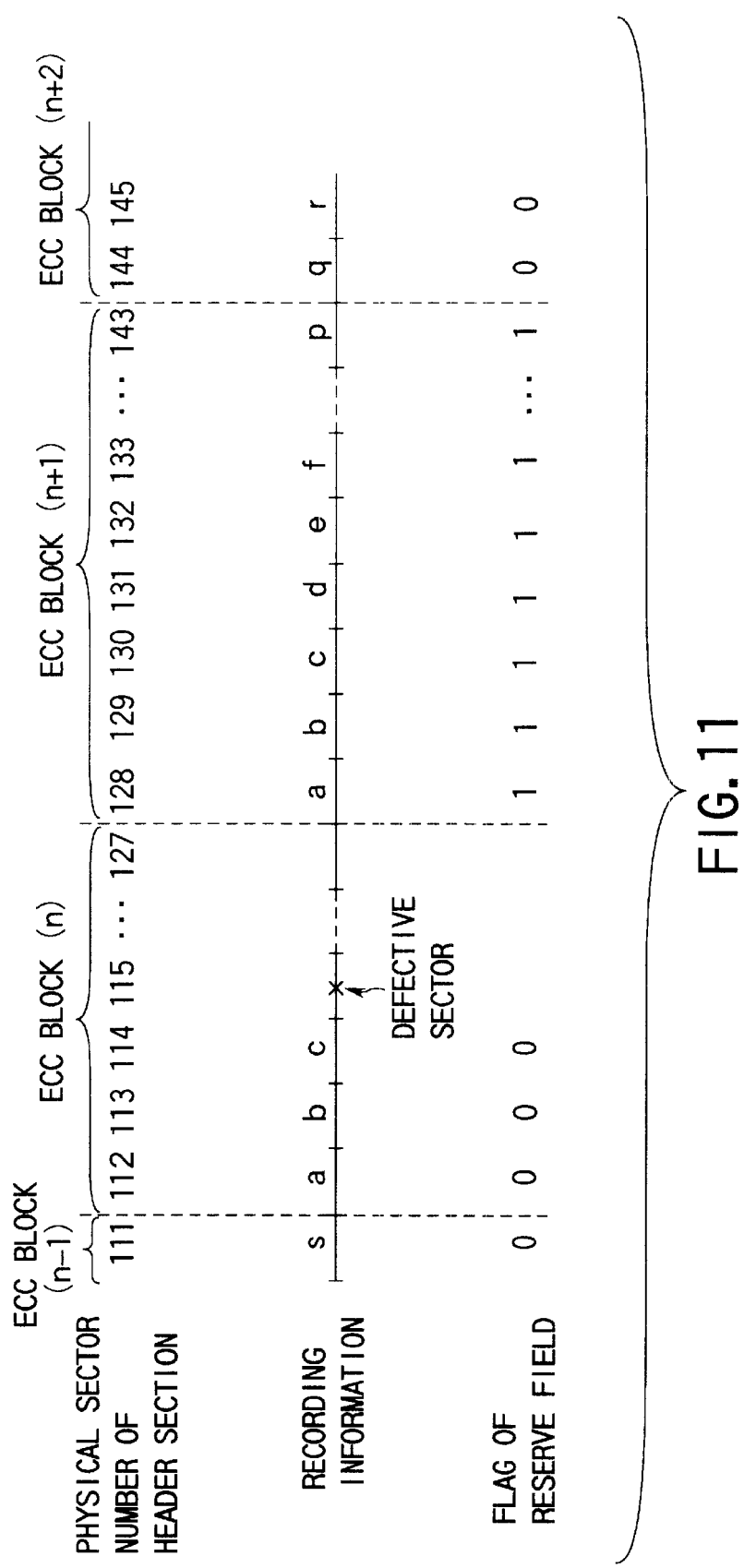

In the above embodiment, the block number obtained by adding an amount of 16 sectors for each skipping process of the ECC block is recorded into the reserve field RSV of each sector as data for searching for the defective portion, but this invention is not limited to this example, and a flag indicating that a preceding ECC block is skipped may be used as data for searching for the defective portion as shown in FIG. 11.

In this case, because an ECC block (n) is skipped, a flag "1" is recorded in the reserve field RSV of each sector of the ECC block (n+1). If an ECC block is not skipped, a flag "0" is recorded in the reserve field RSV of each sector of the ECC block succeeding to that ECC block. As a result, the controller 22 determines skipping of the preceding ECC block based on the flag recorded in the reserve field RSV of each sector when detecting the interruption of the recording process and can detect a sector to which "0" is not attached for the first time as a defective sector based on the flag recorded in the reserve field RSV of each sector of the ECC block which is determined to be skipped.

Therefore, the ECC block containing the defective sector can be detected later based on the flag recorded in the reserve field RSV of each sector of the ECC block even if the power supply is turned OFF by mistake or power failure in the course of recording and data up to the interruption can be reproduced without being influenced by the defective sector.

Figure 12:
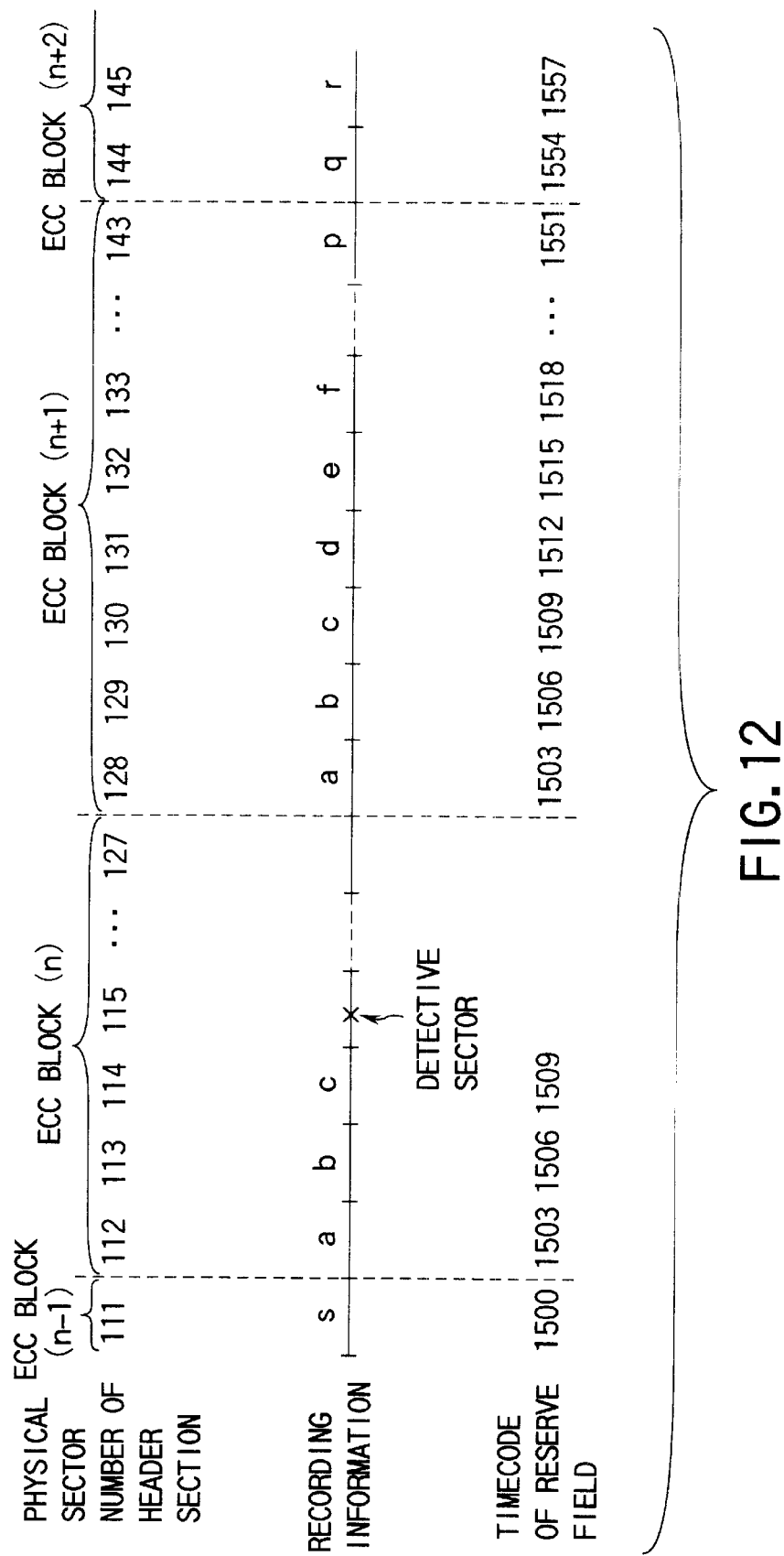

Further, a time code (the unit is millisecond) indicating the recording time may be recorded in the reserve field RSV of each sector as data for searching for the defective portion as shown in FIG. 12.

In this case, the same time code as that recorded in the reserve field RSV of each sector of the ECC block (n) is recorded in the reserve filed RSV of each sector of the ECC block (n+1) because the ECC block (n) is skipped. Therefore, the controller 22 determines skipping of one of the ECC blocks which has a smaller block number when the same time code is present in the ECC blocks based on the time code recorded in the reserve field RSV of each sector at the time of detection of the interruption of recording and can determine a sector to which the time code is not recorded for the first time as a defective sector based on the time code recorded in the reserve field RSV of each sector of the ECC block determined to be skipped.

Therefore, the ECC block containing the defective section can be detected later according to the time code recorded in the reserve field RSV of each sector of the ECC block even if the power supply is turned OFF by mistake or power failure in the course of recording, and data recorded up to the interruption can be reproduced without being influenced by the defective sector.

Figure 13:
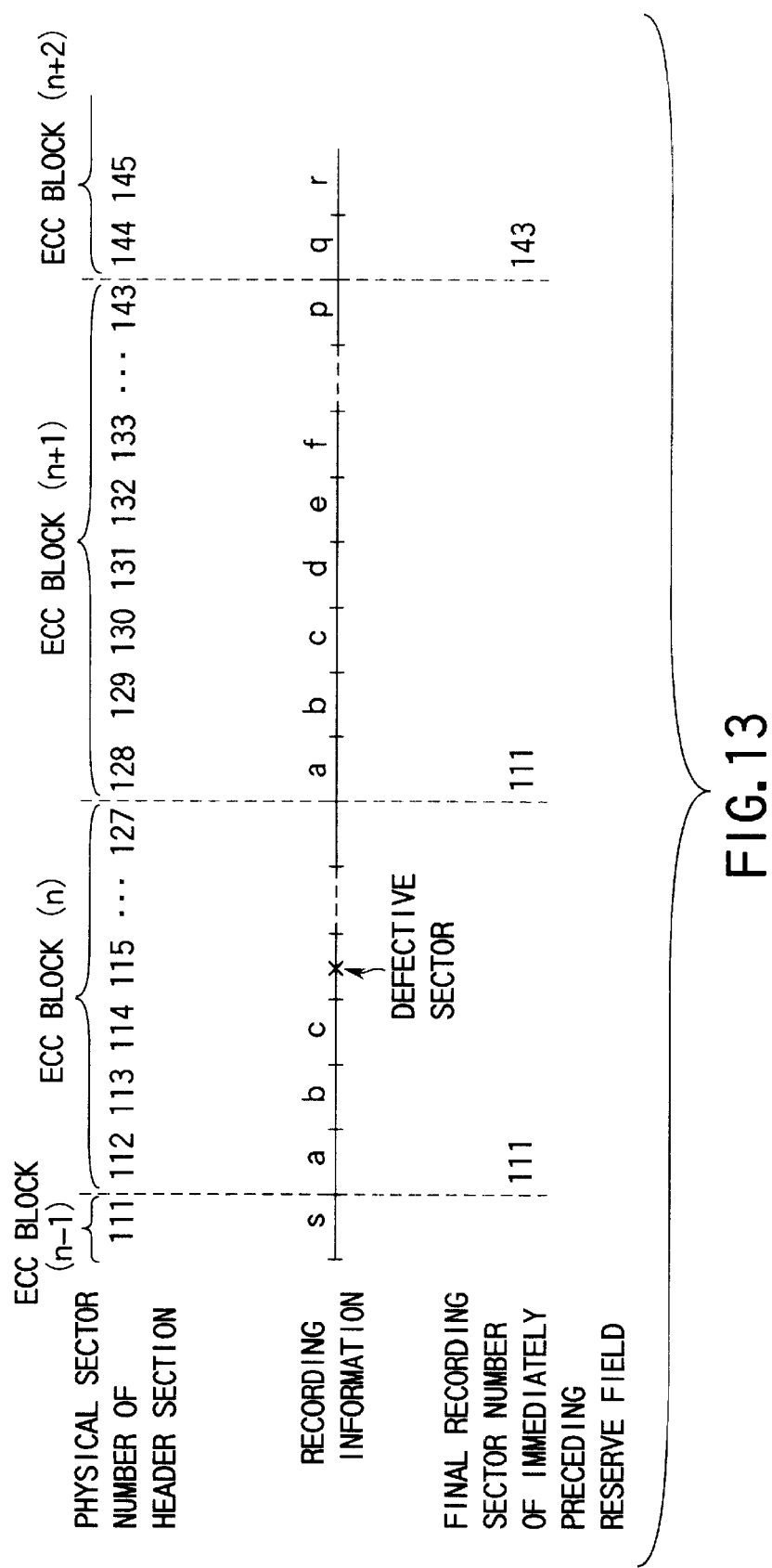

Further, a physical address number of a final sector of an ECC block reproduced immediately before may be recorded in the reserve field RSV of the head sector of the ECC block as data for searching for the defective portion as shown in FIG. 13.

In this case, the physical address number of the header section of the final sector of the ECC block reproduced immediately before is recorded only in the reserve field RSV of the head sector of each ECC block.

As shown in FIG. 13, the physical address number "111" is recorded in the reserve fields RSV of the head sectors of the ECC block (n) and ECC block (n+1) because the ECC block (n) is skipped. As a result, the controller 22 determines skipping of the ECC block based on the address number recorded in the reserve field RSV of the head sector of each ECC block at the time of detection of the interruption of recording and can determine the head sector of the ECC block determined to be skipped as a defective sector.

Therefore, the ECC block containing the defective sector can be detected later according to the address number recorded in the reserve field RSV of the head sector of the ECC block even if the power supply is turned OFF by mistake or power failure in the course of recording and data recorded up to the interruption can be reproduced without being influenced by the defective sector.

Further, an ECC block number given in the recording order of the optical disk may be recorded in the reserve field RSV of each sector as data for searching for the defective portion as shown in FIG. 14.

In this case, n is recorded in the reserve fields RSV of the first to third sectors of the ECC block (n) and n is recorded in the reserve field RSV of each sector of the ECC block (n+1) because the ECC block (n) is skipped. As a result, the controller 22 determines skipping of one of the ECC blocks which has a smaller number when the same ECC block number is detected based on the ECC block number recorded in the reserve field RSV of each sector at the time of detection of the interruption of recording and can determine the sector to which the ECC block number is not attached for the first time as a defective sector based on the ECC block number recorded in the reserve field RSV of each sector of the ECC block determined to be skipped.

Therefore, the ECC block containing the defective sector can be detected later according to the ECC block number recorded in the reserve field RSV of each sector of the ECC block even if the power supply is turned OFF by mistake or power failure in the course of recording and data recorded up to the interruption can be reproduced without being influenced by the defective sector.

Further, as shown in FIG. 15, when data is recorded for every plurality of ECC blocks and data is recorded in a free ECC block lying in the halfway portion, data is recorded in a free area having a capacity larger than the data amount to be recorded by taking the skipping process in the ECC block unit into consideration.

For example, as shown in FIG. 15, when a continuous portion of 3 MB and a continuous portion of 8 MB are provided as free ECC blocks and if moving picture data of 3 MB is recorded, data is recorded in the free area of 8 MB by predicting that the defect amount of the optical disk is 0.5 MB.

Therefore, as described above, since the recording area determined by taking the skipping margin of ECC block unit into consideration is specified, data can be stably recorded without overwriting on next data even if a defect is detected on the optical disk in the course of recording and the skipping process is effected many times.

In the above case, as a first example, the recording start position and recording end position, the size of data to be recorded and data to be recorded are input from the external device and the controller 22 records the input data into a portion between the recording start position and recording end position on the optical disk 1 which is larger than the input size of data to be recorded by an amount of a plurality of sectors or a preset number of ECC blocks.

Further, as a second example, the controller 22 sets the recording start position and the recording end position which is separated from the recording start position by a distance longer than a distance corresponding to data supplied by predicting defects on the optical disk 1 according to the state of a free area of the optical disk 1 for the length of data supplied for recording from the external device and records the supplied data into a portion between the thus set recording starting position and recording end position of the optical disk 1.

In each of the first and second examples, the recording process is interrupted or dummy data is recorded if the data recording process is terminated at a position before the recording end position at the time of data recording.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus comprising:
   producing means for producing format data of an ECC block which comprises (i) a first predetermined number of sectors, each of which comprises a second predetermined number of rows, each having a third predetermined number of bytes, (ii) a plurality of lateral error correction codes which comprise a fourth predetermined number of rows, said fourth number being equal to said second number, each of the rows of the lateral error correction codes having a fifth predetermined number of bytes, each of the lateral error correction codes being laterally attached to one of the rows of the sectors, respectively, and (iii) a vertical error correction code being vertically attached to the sectors, the vertical error correction code comprising a number of rows equal to the first number, each of the rows of the vertical error correction code having a calculated number of bytes, the calculated number obtained by adding the third number and the fifth number, the ECC block comprising ECC rows, a number of the ECC rows obtained by adding the first number to an intermediate number obtained by multiplying the first number by the second number, each of the ECC rows having the calculated number of bytes, the format data being used as a unit when recording and reproducing;

recording means for completing recording of the format data of the ECC block by recording a predetermined amount of sector data in data areas of sector areas of an optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas in which first address data indicating a position on the tracks is recorded beforehand, each of the sector areas having a predetermined track length, each of the sector areas comprising a data area in which predetermined data is recorded, whereby said recording means records the sector data respectively in data areas of sector areas of the optical disk, the sector data respectively comprising (i) the sectors, (ii) the lateral error correction codes laterally attached to the rows, and (iii) the rows of the vertical error correction code each of which is attached to a last one of the rows of each of the sectors;

determining means for determining a defect location when the recording means records sector data in each of said sector areas; and processing means for performing skipping replacement recording if the determining means determines the defect location in at least one of the sector areas, said processing means skipping the data areas of the sector areas containing a defect in units of at least one ECC block, and recording sector data of said predetermined number in a subsequent data area determined after skipping such that second address data, which has been changed in accordance with the skipping executed in units of at least one ECC block, is provided at a position different from that of the first address data, thereby completing recording of the format data of the ECC block.

2. An optical disk apparatus comprising:

producing means for producing format data of an ECC block which comprises (i) a first predetermined number of sectors, each of which comprises a second predetermined number of rows, each having a third predetermined number of bytes, (ii) a plurality of lateral error correction codes which comprise a fourth predetermined number of rows, said fourth number being equal to said second number, each of the rows of the lateral error correction codes having a fifth predetermined number of bytes, each of the lateral error correction codes being laterally attached to one of the rows of the sectors, respectively, and (iii) a vertical error correction code being vertically attached to the sectors, the vertical error correction code comprising a number of rows equal to the first number, each of the rows of the vertical error correction code having a calculated number of bytes, the calculated number obtained by adding the third number and the fifth number, the ECC block comprising ECC rows, a number of the ECC rows obtained by adding the first number to an intermediate number obtained by multiplying the first number by the second number, each of the ECC rows having the calculated number of bytes, the format data being used as a unit when recording and reproducing;

recording means for completing recording of the format data of the ECC block by recording sector data, respectively, in data areas of sector areas of an optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas, each of the sector areas having a predetermined track length, each of the sector areas comprising a header area in which first address data indicating a position on the tracks is recorded beforehand, and a data area which is subsequent to the header area and in which predetermined data is recorded, whereby said recording means records the sector data respectively in data areas of sector areas of the optical disk, the sector data respectively comprising (i) the sectors, (ii) the lateral error correction codes laterally attached to the rows, and (iii) the rows of the vertical error correction code each of which is attached to a last one of the rows of each of the sectors;

determining means for determining a defect location when the recording means records sector data in each of said sector areas; and processing means for performing skipping replacement recording if the determining means determines the defect location in at least one of the sector areas, said processing means skipping the data areas of the sector areas containing a defect in units of at least one data area, and recording sector data of said predetermined number in a subsequent data area determined after skipping such that second address data, which has been changed in accordance with the skipping executed in units of at least one ECC block, is provided at a position different from that of the first address data, thereby completing recording of the format data of the ECC block.

3. An optical disk apparatus comprising:

producing means for producing format data of an ECC block which comprises (i) 16 sectors, each of which comprises 12 rows, each having 172 bytes, (ii) a plurality of lateral error correction codes which comprise 12 rows, each of the rows of the lateral error correction codes having 10 bytes, each of the lateral error correction codes being laterally attached to one of the rows of the sectors, respectively, and (iii) a vertical error correction code being vertically attached to the sectors, the vertical error correction code comprising 16 rows, each of the rows of the vertical error correction code having 182 bytes, the ECC block comprising 208 ECC rows, each of the ECC rows having 182 bytes, the format data being used as a unit when recording and reproducing;

recording means for completing recording of the format data of the ECC block by recording 16 sector data, respectively, in data areas of 16 sector areas of an optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas, each of the sector areas having a predetermined track length, each of the sector areas comprising a header area in which first address data indicating a position on the tracks is recorded beforehand, and a data area which is subsequent to the header area and in which predetermined data is recorded, whereby said recording means records the sector data respectively in data areas of sector areas of the optical disk, the sector data respectively comprising (i) the sectors, (ii) the lateral error correction codes laterally attached to the rows, and (iii) the rows of the vertical error correction code each of which is attached to a last one of the rows of each of the sectors;

determining means for determining whether a defect location when the recording means records sector data in each of said sector areas; and processing means for performing skipping replacement recording if the determining means determines the defect location in at least one of the sector areas, said processing means skipping the data areas of the 16 sector areas containing a defect in units of at least one ECC block, and recording 16 sector data in a subsequent data area determined after skipping such that second address data, which has been changed in accordance with the skipping executed in units of at least one ECC block, is provided at a position different from that of the first address data, thereby completing recording of the format data of the ECC block.

4. An optical disk apparatus according to any one of claims 1–3, wherein first address data and second address data are recorded in each of the sector areas, the first address data being address data which remains unchanged before and after the skipping is executed in units of at least one ECC block, and said second address data being address data which changes after the skipping is executed in units of at least one ECC block.

5. An optical disk apparatus according to any one of claims 1–3, wherein the defect determined by the determining means is an initial defect.

6. An optical disk apparatus according to any one of claims 1–3, wherein consecutive second address data are attached to ECC blocks which are before and after the at least one ECC block that contains the defect and is skipped.

7. A recording method for an optical disk, comprising the steps of:

producing format data of an ECC block which comprises (i) a first predetermined number of sectors, each of which comprises a second predetermined number of rows, each having a third predetermined number of bytes, (ii) a plurality of lateral error correction codes which comprise a fourth predetermined number of rows, said fourth number being equal to said second number, each of the rows of the lateral error correction codes having a fifth predetermined number of bytes, each of the lateral error correction codes being laterally attached to one of the rows of the sectors, respectively, and (iii) a vertical error correction code being vertically attached to the sectors, the vertical error correction code comprising a number of rows equal to the first number, each of the rows of the vertical error correction code having a calculated number of bytes, the calculated number obtained by adding the third number and the fifth number, the ECC block comprising ECC rows, a number of the ECC rows obtained by adding the first number to an intermediate number obtained by multiplying the first number by the second number, each of the ECC rows having the calculated number of bytes, the format data being used as a unit when recording and reproducing;

completing recording of the format data of the ECC block produced in the producing step by recording a predetermined amount of sector data in data areas of sector areas of the optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas in which first address data indicating a position on the tracks is recorded beforehand, each of the sector areas having a predetermined track length, each of the sector areas comprising a data area in which predetermined data is recorded, whereby the sector data is recorded in data areas of sector areas of the optical disk, the sector data respectively comprising (i) the sectors, (ii) the lateral error correction codes laterally attached to the rows, and (iii) the rows of the vertical error correction code each of which is attached to a last one of the rows of each of the sectors;

determining a defect location when sector data is recorded in each of said sector areas in the recording step; and performing skipping replacement recording if the defect location is present in at least one of the sector areas in the determining step, said skipping replacement recording being executed by skipping the data areas of the sector areas containing a defect in units of at least one ECC block, and recording sector data of said predetermined number in a subsequent data area determined after skipping such that second address data, which has been changed in accordance with the skipping executed in units of at least one ECC block, is provided at a position different from that of the first address data, thereby completing recording of the format data of the ECC block.

8. A recording method for an optical disk, comprising the steps of:

producing format data of an ECC block which comprises (i) a first predetermined number of sectors, each of which comprises a second predetermined number of rows, each having a third predetermined number of bytes, (ii) a plurality of lateral error correction codes which comprise a fourth predetermined number of rows, said fourth number being equal to said second number, each of the rows of the lateral error correction codes having a fifth predetermined number of bytes, each of the lateral error correction codes being laterally attached to one of the rows of the sectors, respectively, and (iii) a vertical error correction code being vertically attached to the sectors, the vertical error correction code comprising a number of rows equal to the first number, each of the rows of the vertical error correction code having a calculated number of bytes, the calculated number obtained by adding the third number and the fifth number, the ECC block comprising ECC rows, a number of the ECC rows obtained by adding the first number to an intermediate number obtained by multiplying the first number by the second number, each of the ECC rows having the calculated number of bytes, the format data being used as a unit when recording and reproducing;

completing recording of the format data of the ECC block by recording sector data, respectively, in data areas of sector areas of the optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas, each of the sector areas having a predetermined track length, each of the sector areas comprising a header area in which first address data indicating a position on the tracks is recorded beforehand, and a data area which is subsequent to the header area and in which predetermined data is recorded, whereby the sector data is recorded in data areas of sector areas of the optical disk, the sector data respectively comprising (i) the sectors, (ii) the lateral error correction codes laterally attached to the rows, and (iii) the rows of the vertical error correction code each of which is attached to a last one of the rows of each of the sectors;

determining a defect location when sector data is recorded in each of said sector areas in the recording step; and performing skipping replacement recording if the determining step determines the defect location in one of the sector areas, said skipping replacement recording being executed by skipping the data areas of the sector areas containing a defect in units of at least one ECC block, and recording sector data of said predetermined number in a subsequent data area determined after skipping such that second address data, which has been changed in accordance with the skipping executed in units of at least one ECC block, is provided at a position different from that of the first address data, thereby completing recording of the format data of the ECC block.

9. A recording method for an optical disk, comprising the steps of:

producing format data of an ECC block which comprises (i) 16 sectors, each of which comprises 12 rows, each having 172 bytes, (ii) a plurality of lateral error correction codes which comprise 12 rows, each of the rows of the lateral error correction codes having 10 bytes, each of the lateral error correction codes being laterally attached to one of the rows of the sectors, respectively, and (iii) a vertical error correction code being vertically attached to the sectors, the vertical error correction code comprising 16 rows, each of the rows of the vertical error correction code having 182 bytes, the ECC block comprising 208 ECC rows, each of the ECC rows having 182 bytes, the format data being used as a unit when recording and reproducing;

completing recording of the format data of the ECC block by recording 16 sector data, respectively, in data areas of 16 ones of sector areas of the optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas, each of the sector areas having a predetermined track length, each of the sector areas comprising a header area in which first address data indicating a position on the tracks is recorded beforehand, and a data area which is subsequent to the header area and in which predetermined data is recorded, whereby the sector data is recorded in data areas of sector areas of the optical disk, the sector data respectively comprising (i) the sectors, (ii) the lateral error correction codes laterally attached to the rows, and (iii) the rows of the vertical error correction code each of which is attached to a last one of the 12 rows of each of the sectors;

determining a defect location when sector data is recorded in each of said of sector areas in the recording step; and performing skipping replacement recording if the determining step determines the defect location in at least one of the sector areas, said skipping replacement recording being executed by skipping the data areas of the 16 sector areas containing a defect in units of at least one ECC block, and recording sector data of said predetermined number in a subsequent data area determined after skipping such that second address data, which has been changed in accordance with the skipping executed in units of at least one ECC block, is provided at a position different from that of the first address data, thereby completing recording of the format data of the ECC block.

10. A recording method according to any one of claims 7–9, wherein first address data and second address data are recorded in each of the sector areas, the first address data being address data which remains unchanged before and after the skipping is executed in units of at least one ECC block, and said second address data being address data which changes after the skipping is executed in units of at least one ECC block.

11. A recording method according to any one of claims 7–9, wherein the defect determined in the determining step is an initial defect.

12. A recording method according to any one of claims 7–9, wherein consecutive second address data are attached to ECC blocks which are before and after the at least one ECC block that contains the defect and is skipped.

13. An optical disk for use in an optical disk apparatus that comprises:

producing means for producing format data of an ECC block which comprises (i) a first predetermined number of sectors, each of which comprises a second predetermined number of rows, each having a third predetermined number of bytes, (ii) a plurality of lateral error correction codes which comprise a fourth predetermined number of rows, said fourth number being equal to said second number, each of the rows of the lateral error correction codes having a fifth predetermined number of bytes, each of the lateral error correction codes being laterally attached to one of the rows of the sectors, respectively, and (iii) a vertical error correction code being vertically attached to the sectors, the vertical error correction code comprising a number of rows equal to the first number, each of the rows of the vertical error correction code having a calculated number of bytes, the calculated number obtained by adding the third number and the fifth number, the ECC block comprising ECC rows, a number of the ECC rows obtained by adding the first number to an intermediate number obtained by multiplying the first number by the second number, each of the ECC rows having the calculated number of bytes, the format data being used as a unit when recording and reproducing;

recording means for completing recording of the format data of the ECC block by recording a predetermined amount of sector data in data areas of sector areas of the optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas in which first address data indicating a position on the tracks is recorded beforehand, each of the sector areas having a predetermined track length, each of the sector areas comprising a data area in which predetermined data is recorded, whereby said recording means records the sector data respectively in data areas of sector areas of the optical disk, the sector data respectively comprising (i) the sectors, (ii) the lateral error correction codes laterally attached to the rows, and (iii) the rows of the vertical error correction code each of which is attached to a last one of the rows of each of the sectors;

determining means for determining a defect location when the recording means records sector data in each of said sector areas; and processing means for performing skipping replacement recording if the determining means determines the defect location in at least one of the sector areas, said processing means skipping the data areas of the sector areas containing a defect in units of at least one ECC block, and recording sector data of said predetermined number in a subsequent data area determined after skipping such that second address data, which has been changed in accordance with the skipping executed in units of at least one ECC block, is provided at a position different from that of the first address data, thereby completing recording of the format data of the ECC block;

wherein the optical disk comprises concentric or spiral tracks for recording data, the tracks including a plurality of sector areas in which first address data indicating a position on the tracks is recorded beforehand, each of the sector areas having a predetermined track length, each of the sector areas comprising a data area in which predetermined data is recorded, and wherein the format data of the ECC block being recorded by skipping replacement recording, where the format data of the ECC block is successively recorded in consecutive data areas and if the defect location is detected in at least one sector area of one data area, said skipping replacement recording being executed by skipping the data areas of the sector areas containing a defect in units of at least one ECC block, and recording sector data of said predetermined number in a subsequent data area determined after skipping, said sector data being recorded such that second address data, which has been changed in accordance with the skipping executed in units of at least one ECC block, is provided at a position different from that of the first address data, thereby completing recording of the format data of the ECC block.

14. An optical disk for use in an optical disk apparatus that comprises:

producing means for producing format data of an ECC block which comprises (i) a first predetermined number of sectors, each of which comprises a second predetermined number of rows, each having a third predetermined number of bytes, (ii) a plurality of lateral error correction codes which comprise a fourth predetermined number of rows, said fourth number being equal to said second number, each of the rows of the lateral error correction codes having a fifth predetermined number of bytes, each of the lateral error correction codes being laterally attached to one of the rows of the sectors, respectively, and (iii) a vertical error correction code being vertically attached to the sectors, the vertical error correction code comprising a number of rows equal to the first number, each of the rows of the vertical error correction code having a calculated number of bytes, the calculated number obtained by adding the third number and the fifth number, the ECC block comprising ECC rows, a number of the ECC rows obtained by adding the first number to an intermediate number obtained by multiplying the first number by the second number, each of the ECC rows having the calculated number of bytes, the format data being used as a unit when recording and reproducing;

recording means for completing recording of the format data of the ECC block by recording sector data, respectively, in data areas of sector areas of the optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas, each of the sector areas having a predetermined track length, each of the sector areas comprising a header area in which first address data indicating a position on the tracks is recorded beforehand, and a data area which is subsequent to the header area and in which predetermined data is recorded, whereby said recording means records the sector data respectively in data areas of sector areas of the optical disk, the sector data respectively comprising (i) the sectors, (ii) the lateral error correction codes laterally attached to the rows, and (iii) the rows of the vertical error correction code each of which is attached to a last one of the rows of each of the sectors;

determining means for determining a defect location when the recording means records sector data in each of said sector areas; and processing means for performing skipping replacement recording if the determining means determines the defect location in one of the sector areas, said processing means skipping the data areas of the sector areas containing a defect in units of at least one ECC block, and recording sector data of said predetermined number in a subsequent data area determined after skipping such that second address data, which has been changed in accordance with the skipping executed in units of at least one ECC block, is provided at a position different from that of the first address data, thereby completing recording of the format data of the ECC block;

wherein said optical disk comprises concentric or spiral tracks for recording data, the tracks including a plurality of sector areas, each of the sector areas having a predetermined track length and comprising a header area in which first address data indicating a position on the tracks is recorded beforehand, and a data area which is subsequent to the header area and in which predetermined data is recorded, and wherein the format data of the ECC block being recorded by skipping replacement recording, where the format data of the ECC block is successively recorded in consecutive data areas and if the defect location is detected in at least one sector area of one data area, said skipping replacement recording being executed by skipping the data areas of the sector areas containing a defect in units of at least one ECC block, and recording sector data of said predetermined number in a subsequent data area determined after skipping, said sector data being recorded such that second address data, which has been changed in accordance with the skipping executed in units of at least one ECC block, is provided at a position different from that of the first address data, thereby completing recording of the format data of the ECC block.

15. An optical disk for use in an optical disk apparatus that comprises:

producing means for producing format data of an ECC block which comprises (i) 16 sectors, each of which comprises 12 rows, each having 172 bytes, (ii) a plurality of lateral error correction codes which comprise 12 rows, each of the rows of the lateral error correction codes having 10 bytes, each of the lateral error correction codes being laterally attached to one of the rows of the sectors, respectively, and (iii) a vertical error correction code being vertically attached to the sectors, the vertical error correction code comprising 16 rows, each of the rows of the vertical error correction code having 182 bytes, the ECC block comprising 208 ECC rows, each of the ECC rows having 182 bytes, the format data being used as a unit when recording and reproducing;

recording means for completing recording of the format data of the ECC block by recording 16 sector data, respectively, in data areas of 16 ones of sector areas of the optical disk, the sector data comprising (i) the sectors, (ii) the lateral error correction codes laterally attached to the rows, and (iii) the rows of the vertical error correction code, each being attached to a last one of the rows of each of the sectors, the optical disk comprising at least one of concentric and spiral tracks for recording data, the tracks including a plurality of sector areas, each of the sector areas having a predetermined track length, each of the sector areas comprising a header area in which first address data indicating a position on the tracks is recorded beforehand, and a data area which is subsequent to the header area and in which predetermined data is recorded, whereby said recording means records the sector data respectively in data areas of sector areas of the optical disk, the sector data respectively comprising (i) the sectors, (ii) the lateral error correction codes laterally attached to the rows, and (iii) the rows of the vertical error correction code each of which is attached to a last one of the rows of each of the sectors;

determining means for determining a defect location when the recording means records sector data in each of said sector areas; and processing means for performing skipping replacement recording if the determining means determines the defect location in at least one of the sector areas, said processing means skipping the data areas of the 16 sector areas containing a defect in units of at least one ECC block, and recording 16 sector data in a subsequent data area determined after skipping such that second address data, which has been changed in accordance with the skipping executed in units of at least one ECC block, is provided at a position different from that of the first address data, thereby completing recording of the format data of the ECC block;

wherein said optical disk comprises concentric or spiral tracks for recording data, the tracks including a plurality of sector areas in which first address data indicating a position on the tracks is recorded beforehand, each of the sector areas having a predetermined track length, each of the sector areas comprising a data area in which predetermined data is recorded, and wherein the format data of the ECC block being recorded by skipping replacement recording, where the format data of the ECC block is successively recorded in consecutive data areas and if the defect location is detected in at least one sector area of one data area, said skipping replacement recording being executed by skipping the data areas of the sector areas containing a defect in units of at least one ECC block, and recording sector data of said predetermined number in a subsequent data area determined after skipping, said sector data being recorded such that second address data, which has been changed in accordance with the skipping executed in units of at least one ECC block, is provided at a position different from that of the first address data, thereby completing recording of the format data of the ECC block.

16. An optical disk according to any one of claims 13–15, wherein first address data and second address data are recorded in each of the sector areas, the first address data being address data which remains unchanged before and after the skipping is executed in units of at least one ECC block, and said second address data being address data which changes after the skipping is executed in units of at least one ECC block.

17. An optical disk according to any one of claims 13–15, wherein the defect determined by the determining means is an initial defect.

18. An optical disk according to any one of claims 13–15, wherein consecutive second address data are attached to ECC blocks which are before and after the at least one ECC block that contains the defect and is skipped.

* * * * *